(12) United States Patent
Ogawa et al.

(10) Patent No.: US 12,306,148 B2
(45) Date of Patent: May 20, 2025

(54) ANALYSIS SYSTEM AND ANALYSIS EXECUTION METHOD

(71) Applicant: SHIMADZU CORPORATION, Kyoto (JP)

(72) Inventors: Keisuke Ogawa, Columbia, MD (US); Andy Sasaki, Columbia, MD (US); Kerry Hill, Columbia, MD (US); Timothy Lee, Columbia, MD (US)

(73) Assignee: SHIMADZU CORPORATION, Kyoto (JP)

( * ) Notice: Subject to any disclaimer, the term of this patent is extended or adjusted under 35 U.S.C. 154(b) by 720 days.

(21) Appl. No.: 17/514,965

(22) Filed: Oct. 29, 2021

(65) Prior Publication Data

US 2022/0137011 A1 May 5, 2022

Related U.S. Application Data

(60) Provisional application No. 63/110,006, filed on Nov. 5, 2020.

(30) Foreign Application Priority Data

May 26, 2021 (JP) .................................. 2021-088826

(51) Int. Cl.
 *G01N 30/72* (2006.01)
 *G01N 30/64* (2006.01)
 *H01J 49/26* (2006.01)

(52) U.S. Cl.
 CPC ............. *G01N 30/72* (2013.01); *G01N 30/64* (2013.01); *H01J 49/26* (2013.01)

(58) Field of Classification Search
 CPC .. G01N 30/72; G01N 30/64; G01N 2030/628; H01J 49/26
 See application file for complete search history.

(56) References Cited

U.S. PATENT DOCUMENTS

| | | | | |
|---|---|---|---|---|
| 2014/0040323 A1* | 2/2014 | Nakao | ................ | G01N 30/8658 |
| | | | | 707/812 |
| 2017/0146500 A1* | 5/2017 | Kanazawa | ............. | G01N 30/88 |

(Continued)

FOREIGN PATENT DOCUMENTS

| | | |
|---|---|---|
| JP | 2000-304735 A | 11/2000 |
| JP | 2014-29270 A | 2/2014 |

(Continued)

OTHER PUBLICATIONS

V. G. Arakelian, "The long way to the automatic chromatographic analysis of gases dissolved in insulating oil," in IEEE Electrical Insulation Magazine, vol. 20, No. 6, pp. 8-25, Nov.-Dec. 2004 (Year: 2004).*

(Continued)

*Primary Examiner* — Daniel R Miller
*Assistant Examiner* — George O Sahyoun
(74) *Attorney, Agent, or Firm* — Sughrue Mion, PLLC

(57) ABSTRACT

An analysis system is used to together with a sample supplier that supplies a sample, a detector that detects a sample and a display, and includes a plurality of channels arranged in parallel with one another and a display controller that causes a display to display a control screen in regard to control of the plurality of channels. Each channel includes a mobile phase supplier that supplies a mobile phase and an analysis column that separates a sample that has been supplied by the sample supplier into components and guides the components to the detector.

7 Claims, 19 Drawing Sheets

(56) References Cited

U.S. PATENT DOCUMENTS

| | | | |
|---|---|---|---|
| 2018/0284079 A1* | 10/2018 | Yasunaga | G01N 30/20 |
| 2019/0369070 A1 | 12/2019 | Terada et al. | |
| 2022/0138176 A1* | 5/2022 | Takaya | G06F 16/2365 |
| | | | 707/690 |
| 2023/0358771 A1* | 11/2023 | Kawase | G01N 30/34 |

FOREIGN PATENT DOCUMENTS

| | | | |
|---|---|---|---|
| JP | 2018-169350 A | 11/2018 | |
| WO | WO-2018131068 A1 * | 7/2018 | G01N 30/34 |

OTHER PUBLICATIONS

Japanese Office Action dated Jul. 30, 2024 in Application No. 2021-088826.

\* cited by examiner

| SETTING | DESCRIPTION |
|---|---|
| CREATION OF CALIBRATION CURVE FOR EACH CHANNEL | CALIBRATION CURVE FOR CHANNEL A  CALIBRATION CURVE FOR CHANNEL B |
| CREATE COMMON CALIBRATION CURVE FOR PLURALITY OF CHANNELS | COMMON CALIBRATION CURVE |

ANALYSIS SYSTEM AND ANALYSIS EXECUTION METHOD

BACKGROUND

Technical Field

The present invention relates to an analysis system and an analysis execution method.

Description of Related Art

A chromatograph has been known as an analysis device that separates a substance included in a sample into different components for measurement. For example, in a liquid chromatograph, a sample to be measured is introduced into an analysis column together with a liquid mobile phase. A sample that has been eluted from the analysis column is separated into components based on a difference in chemical property or composition and detected by a detector. In JP 2018-169350 A, a liquid chromatograph including six measurement blocks is described. In each measurement block, an analysis column, etc. are included. The six measurement blocks are used interchangeably, so that a sample is measured under a plurality of conditions.

SUMMARY

The liquid chromatograph described in JP 2018-169350 A can shorten a period of time required for a series of measurement and improve a throughput. However, running of the liquid chromatograph described in JP 2018-169350 A is complicated as compared to running of a liquid chromatograph in a case where a single measurement block is used. Thus, an analysis condition or various settings of a device is complicated. Further, when an abnormality occurs in a device, its cause may not be confirmed immediately. It is a burden for a user when performing an analysis.

Therefore, an object of the present invention is to provide an analysis system and an analysis execution method with improved usability.

An aspect of the present invention relates to an analysis system that is used together with a sample supplier that supplies a sample, a detector that detects a sample and a display, a plurality of channels arranged in parallel with one another, and a flow-path switcher that selectively guides a sample supplied by the sample supplier to the plurality of channels, a display controller that causes the display to display a control screen in regard to control of the plurality of channels, wherein each of the plurality of channels includes a mobile phase supplier that supplies a mobile phase, and an analysis column that separates a sample that has been supplied by the sample supplier into components and guides the components to the detector.

Another aspect of the present invention relates to an analysis system that is used together with a sample supplier that supplies a sample, a detector that detects a sample and a display, that includes a plurality of channels arranged in parallel with one another, a flow-path switcher that selectively guides a sample supplied by the sample supplier to the plurality of channels, and an analysis control device, wherein each of the plurality of channels includes a mobile phase supplier that supplies a mobile phase, and an analysis column that separates a sample that has been supplied by the sample supplier into components and guides the components to the detector, and the data control device includes a data processor, an inputter that inputs running points in time of the sample supplier, any channel out of the plurality of channels, the detector and the data processor, a first controller that controls the sample supplier such that the sample supplier supplies a sample, a second controller that controls the flow-path switcher such that a sample supplied by the sample supplier is guided to the any channel, a third controller that controls the detector such that the detector detects a sample guided from the any channel, a fourth controller that controls the data processor such that the data processor processes detection data of a sample detected by the detector, and a main controller that controls the first controller, the second controller, the third controller and the fourth controller in accordance with running points in time that have been input to the inputter.

A yet another aspect of the present invention relates to an analysis execution method that is used together with a sample supplier that supplies a sample, a detector that detects a sample and a display and includes selectively guiding a sample supplied by the sample supplier to a plurality of channels arranged in parallel with one another by a flow-path switcher, and causing the display to display a control screen in regard to control of the plurality of channels, wherein each of the plurality of channels includes a mobile phase supplier that supplies a mobile phase, and an analysis column that separates a sample that has been supplied by the sample supplier into components and guides the components to the detector.

The present invention can improve usability of an analysis system.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 12 is a diagram showing one example of a second control screen;

FIG. 13 is a diagram showing one example of a third control screen;

FIG. 16 is a diagram showing one example of a sixth control screen;

DETAILED DESCRIPTION

(1) Configuration of Analysis System

Figure 1:
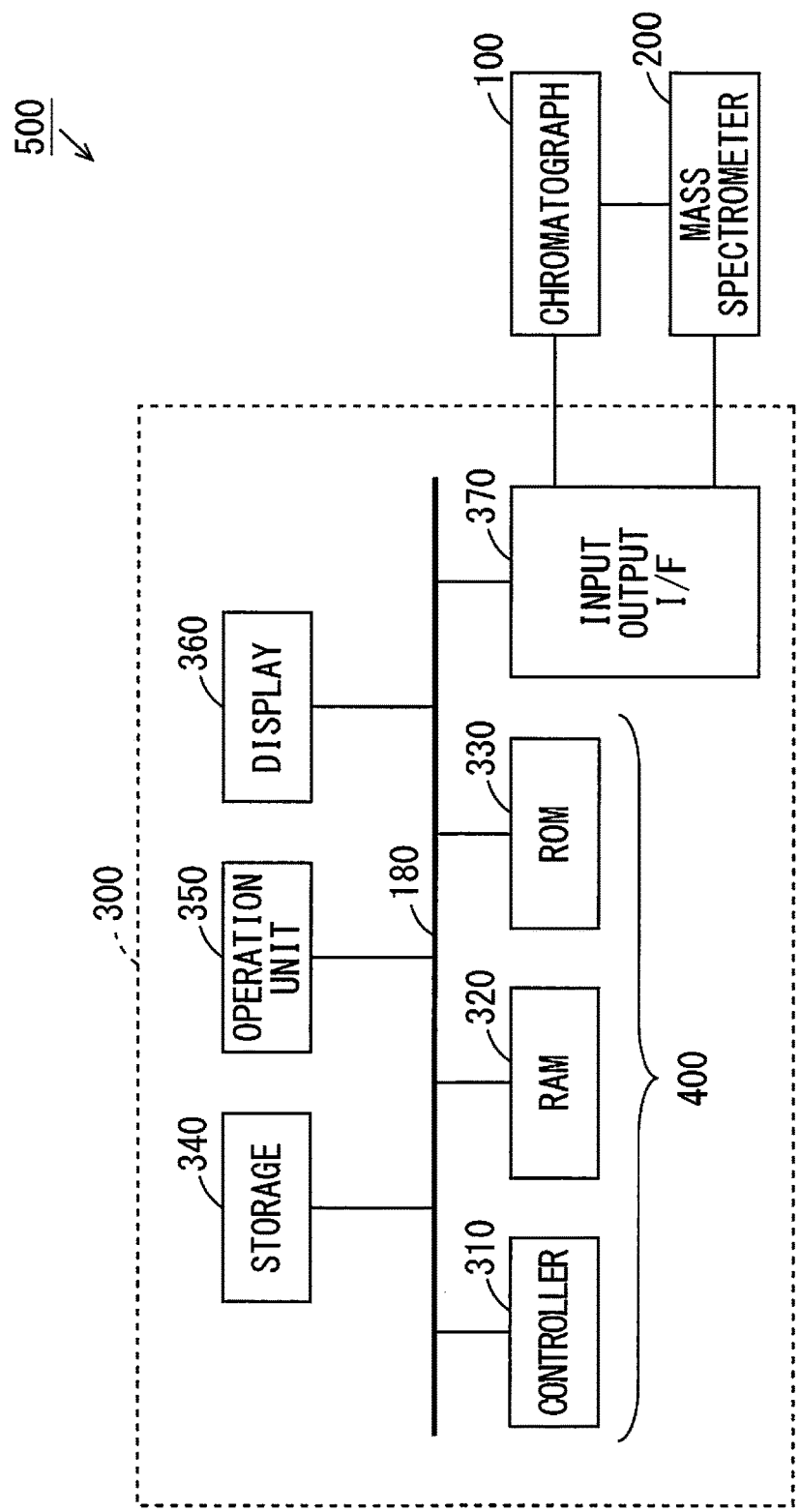
FIG. 1 is a diagram showing the configuration of an analysis system according to one embodiment of the present invention.

An analysis system and an analysis execution method according to embodiments of the present invention will be described below in detail with reference to the drawings. FIG. 1 is a diagram showing the configuration of the analysis system according to one embodiment of the present invention. As shown in FIG. 1, the analysis system 500 includes a chromatograph 100, a mass spectrometer 200 and a processing device 300. In the present embodiment, the analysis system 500 is a LC-MS (Liquid Chromatograph-Mass Spectrometer).

The chromatograph 100 is an LC (Liquid Chromatograph). The configuration of the chromatograph 100 will be described below. The mass spectrometer 200 is used as a detector of the chromatograph 100. Instead of the mass spectrometer 200, an absorbance detector, a fluorescence detector, a differential refractometer or the like may be used as a detector of the chromatograph 100.

The processing device 300 is constituted by a controller 310, a RAM (Random Access Memory) 320, a ROM (Read Only Memory) 330, a storage 340, an operation unit 350, a display 360 and an input output I/F (interface) 370. The controller 310, the RAM 320, the ROM 330, the storage 340, the operation unit 350, the display 360 and the input output I/F 370 are connected to a bus 380. The controller 310, the RAM 320 and the ROM 330 constitute the analysis control device 400.

The controller 310 includes a plurality of CPUs (Central Processing Units), for example. The RAM 320 is used as a work area for the controller 310. A system program is stored in the ROM 330. The storage 340 includes a storage medium such as a hard disc or a semiconductor memory. The analysis control program for controlling the chromatograph 100 by the analysis control device 400 is stored in the storage 340.

The operation unit 350 is an input device such as a keyboard, a mouse or a touch panel and is operated by a user who provides predetermined input or makes selection with respect to the analysis control device 400. The display 360 is a display device such as a liquid crystal display device and displays a predetermined GUI (Graphical User Interface) or the like. The input output I/F 370 is connected to the chromatograph 100 and the mass spectrometer 200.

Figure 2:
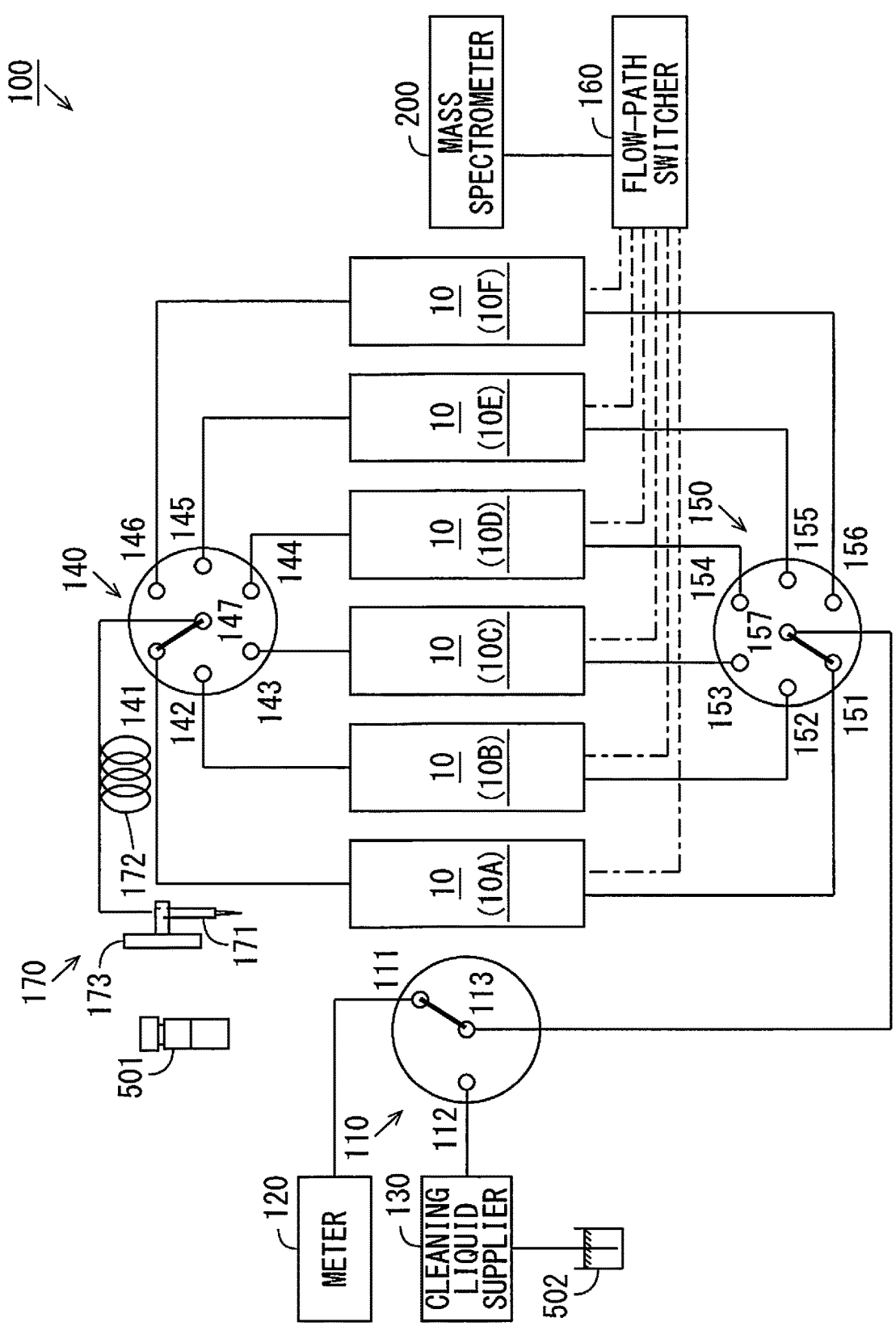
FIG. 2 is a diagram showing the configuration of a chromatograph of FIG. 1.

FIG. 2 is a diagram showing the configuration of the chromatograph 100 of FIG. 1. As shown in FIG. 2, the chromatograph 100 includes a plurality (six in the present example) of channels 10, a low-pressure valve 110, a meter 120, a cleaning liquid supplier 130, flow-path switchers 140, 150, 160 and a sample supplier 170. In a case where the plurality of channels 10 are to be differentiated from one another, the plurality of channels 10 are hereinafter respectively referred to as channels 10A to 10F. The configuration of the channels 10 will be described below.

The low-pressure valve 110, the flow-path switchers 140, 150, 160 are multi-way switch valves, for example. The low-pressure valve 110 has three ports 111 to 113, and the ports 111, 112 are configured to be selectively connectable to the port 113. The meter 120 includes a syringe and a pump, for example, and is connected to the port 111 of the low-pressure valve 110. The meter 120 sucks a sample of a designated quantity.

The cleaning liquid supplier 130 includes a degassing device, a pump and an open-close valve, for example, and is connected to the port 112 of the low-pressure valve 110. The cleaning liquid supplier 130 supplies a cleaning liquid contained in a cleaning liquid container 502 to each channel 10. In the present embodiment, the cleaning liquid supplied to each channel is the same liquid as a mobile phase of the channel 10.

The flow-path switchers 140, 150 are an example of a flow-path switcher. The flow-path switcher 140 has seven ports 141 to 147. The ports 141 to 146 are configured to be selectively connectable to the port 147. The ports 141 to 146 are respectively connected to the channels 10A to 10F. The flow-path switcher 150 has seven ports 151 to 157, and the ports 151 to 156 are configured to be selectively connectable to the port 157. The ports 151 to 156 are respectively connected to the channels 10A to 10F. The port 157 is connected to the port 113 of the low-pressure valve 110.

The configuration of the flow-path switcher 160 is similar to the configuration of the flow-path switchers 140, 150. The flow-path switcher 160 has seven ports (not shown) respectively connected to the channels 10A to 10F and the mass spectrometer 200. The flow-path switcher 160 selectively guides a mobile phase including a sample that is eluted from the plurality of channels 10 to the mass spectrometer 200 by switching the connections among the ports. In FIG. 2, a connection flow path between each channel 10 and a port of the flow-path switcher 160 is indicated by a one-dot and dash line in order to facilitate viewing of the connection relationship.

The sample supplier 170 is an autosampler, for example, and includes a needle 171, a sample loop 172 and a driving device 173. The needle 171 sucks a sample from a sample container 501 and selectively injects a sucked sample into the plurality of channels 10. One end and the other end of the sample loop 172 are respectively connected to the needle 171 and the port 147 of the flow-path switcher 140. The sample loop 172 retains a predetermined volume of a sample has been sucked by the needle 171. The driving device 173 includes an actuator, for example, and drives the needle 171.

The mass spectrometer 200 detects a sample from each channel guided by the flow-path switcher 160. While a single mass spectrometer 200 that is commonly used by the plurality of channels 10 is provided as a detector in the present embodiment, the embodiment is not limited to this. A plurality of detectors respectively corresponding to the plurality of channels 10 may be provided. In this case, because the plurality of detectors are respectively connected to the corresponding channels 10, the chromatograph 100 does not include the flow-path switcher 160.

Figure 3:
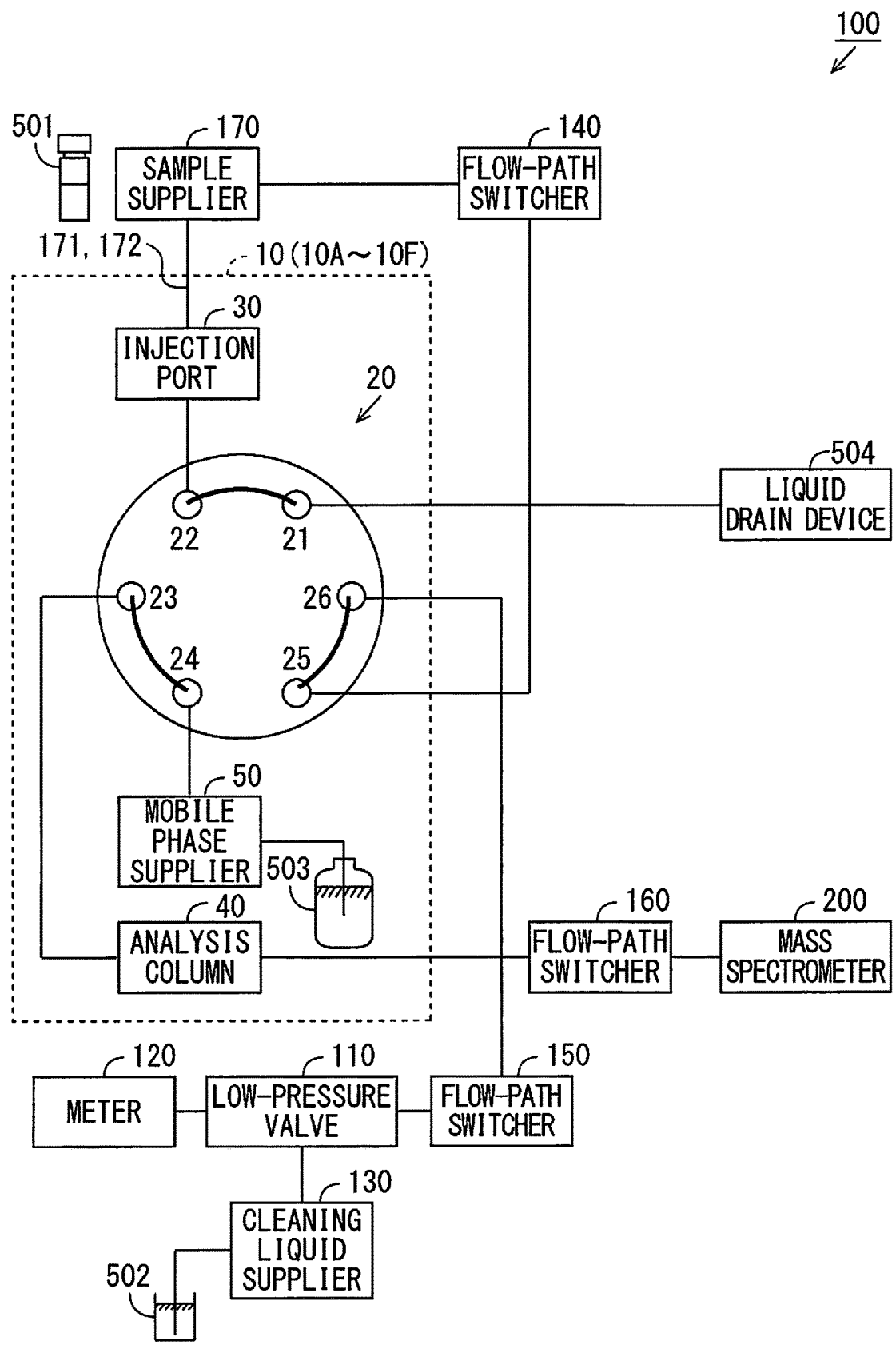
FIG. 3 is a diagram showing the configuration of a channel of FIG. 2.

Because the plurality of channels 10A to 10F have the similar configuration, the configuration of one channel 10 will be described. FIG. 3 is a diagram showing a channel 10 of FIG. 2. As shown in FIG. 3, the channel 10 includes a high-pressure valve 20, an injection port 30, an analysis column 40 and a mobile phase supplier 50. The configurations of the analysis column 40 and the mobile phase supplier 50 may be different for each channel 10. Further, measurement conditions such as a temperature of the analysis column 40 and a flow rate of a mobile phase to be supplied by the mobile phase supplier 50 may be different for each channel 10.

The high-pressure valve 20 has six ports 21 to 26 and is configured to be switchable between a first connection state and a second connection state. In the first connection state, the ports 21, 22 are connected to each other, the ports 23, 24 are connected to each other, and the ports 25, 26 are connected to each other. In the second connection state, the ports 22, 23 are connected to each other, the ports 24, 25 are connected to each other, and the ports 26, 21 are connected to each other. The port 21 is connected to a liquid drain device 504.

The injection port 30 is configured such that the needle 171 of the sample supplier 170 can be inserted into the injection port 30. Further, the injection port 30 is connected to the port 22 of the high-pressure valve 20. The injection port 30 receives a sample injected from the inserted needle 171. The analysis column 40 is contained in a column oven (not shown). One end portion and the other end portion of the analysis column 40 are respectively connected to the port 23 of the high-pressure valve 20 and the flow-path switcher 160. The analysis column 40 separates a sample from the port 23 of the high-pressure valve 20 into components based on differences in chemical property or composition and elutes the sample to the flow-path switcher 160.

The mobile phase supplier 50 includes a high-pressure pump or the like and is connected to the port 24 of the high-pressure valve 20. The mobile phase supplier 50 sucks a liquid mobile phase from the mobile phase container 503 and supplies the sucked mobile phase. A mobile phase that has been supplied by the mobile phase supplier 50 is pumped to the mass spectrometer 200 through the ports 24, 23 of the high-pressure valve 20, the analysis column 40 and the flow-path switcher 160.

The flow-path switchers 140, 150 are respectively connected to the ports 25, 26 of the high-pressure valve 20 of each channel 10. Specifically, the ports 141 to 146 (FIG. 2) of the flow-path switcher 140 of FIG. 2 are respectively connected to the ports 25 of the high-pressure valves 20 of the channels 10A to 10F. The ports 151 to 156 of the flow-path switcher 150 of FIG. 2 are respectively connected to the ports 26 of the high-pressure valves 20 of the channels 10A to 10F. The connection between ports of the flow-path switchers 140, 150 are switched such a selected channel 10 among the channels 10A to 10F can be accessed.

For example, in a case where the channel 10A is selected, the ports 141, 147 of the flow-path switcher 140 are connected to each other, and the ports 151, 157 of the flow-path switcher 150 are connected to each other. In a case where the channel 10B is selected, the ports 142, 147 of the flow-path switcher 140 are connected to each other, and the ports 152, 157 of the flow-path switcher 150 are connected to each other. In a case where the channel 10C is selected, the ports 143, 147 of the flow-path switcher 140 are connected to each other, and the ports 153, 157 of the flow-path switcher 150 are connected to each other.

In a case where the channel 10D is selected, the ports 144, 147 of the flow-path switcher 140 are connected to each other, and the ports 154, 157 of the flow-path switcher 150 are connected to each other. In a case where the channel 10E is selected, the ports 145, 147 of the flow-path switcher 140 are connected to each other, and the ports 155, 157 of the flow-path switcher 150 are connected to each other.

In a case where the channel 10F is selected, the ports 146, 147 of the flow-path switcher 140 are connected to each other, and the ports 156, 157 of the flow-path switcher 150 are connected to each other.

(2) Running of Chromatograph

Figure 4:
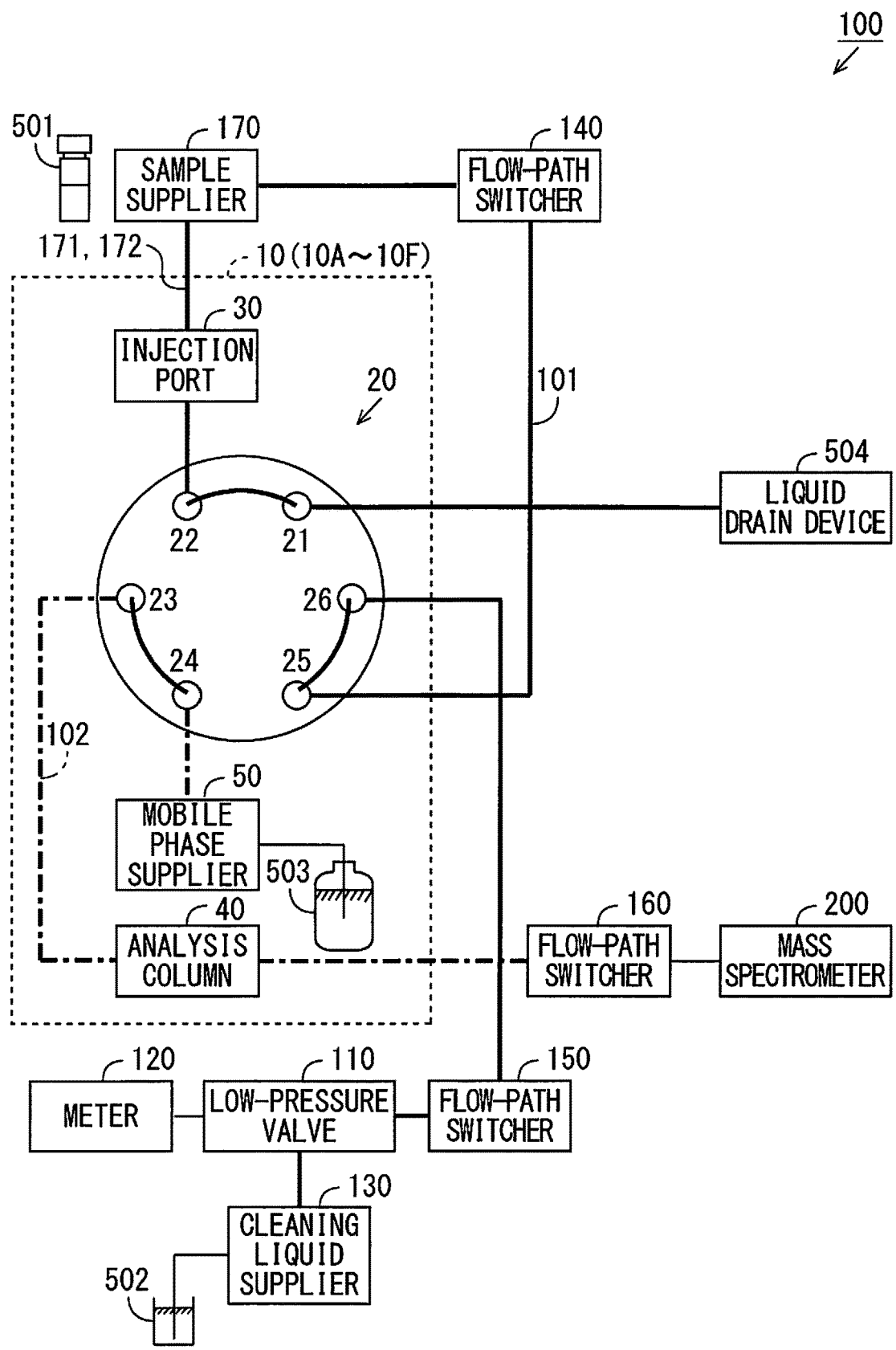
FIG. 4 is a diagram for explaining the running of the chromatograph during pre-processing.

FIG. 4 is a diagram for explaining the running of the chromatograph 100 during pre-processing. As shown in FIG. 4, during pre-processing, a channel to be used is selected from among the channels 10A to 10F. The connection between the flow-path switchers 140, 150 is switched to be accessible to the selected channel 10, and the high-pressure valve 20 of the channel 10 is switched to the first connection state. Further, the ports 112, 113 of the low-pressure valve 110 are connected to each other. Further, the needle 71 of the sample supplier 170 is inserted into the injection port 30 of the selected channel 10.

In this case, as indicated by the thick solid lines in FIG. 4, the cleaning liquid supplier 130 and the liquid drain device 504 are connected to each other by a predetermined flow path (hereinafter referred to as a cleaning flow path 10). The cleaning flow path 101 includes the low-pressure valve 110, the flow-path switcher 150, the ports 26, 25 of the high-pressure valve 20, the flow-path switcher 140, the sample supplier 170 and the ports 22, 21 of the high-pressure valve 20. Part of the cleaning flow path 101 is also used as a measurement flow path 102, described below.

In this connection state, a cleaning liquid contained in the cleaning liquid container 502 is supplied to the cleaning flow path 101 by the cleaning liquid supplier 130. Thus, pre-processing of filling the cleaning flow path 101 with the cleaning liquid that is the same liquid as a mobile phase used for measurement is executed. During execution of the pre-processing, the mobile phase contained in the mobile phase container 503 is supplied to the port 24 of the high-pressure valve 20 by the mobile phase supplier 50. In this case, part of the measurement flow path 102 indicated by the thick one-dot and dash lines in FIG. 4 is filled with the mobile phase.

Figure 5:
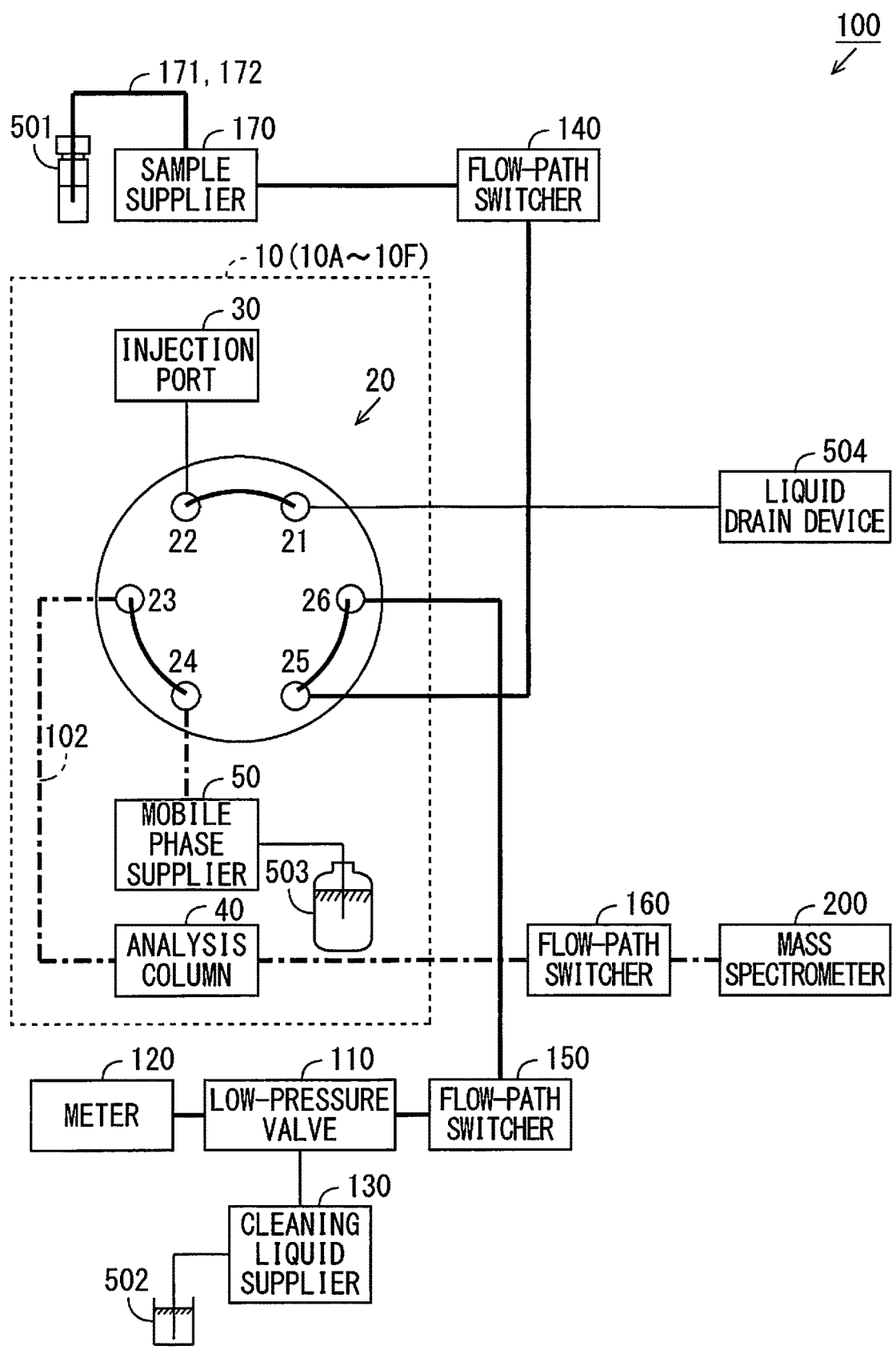
FIG. 5 is a diagram for explaining the running of the chromatograph during measurement.
Figure 6:
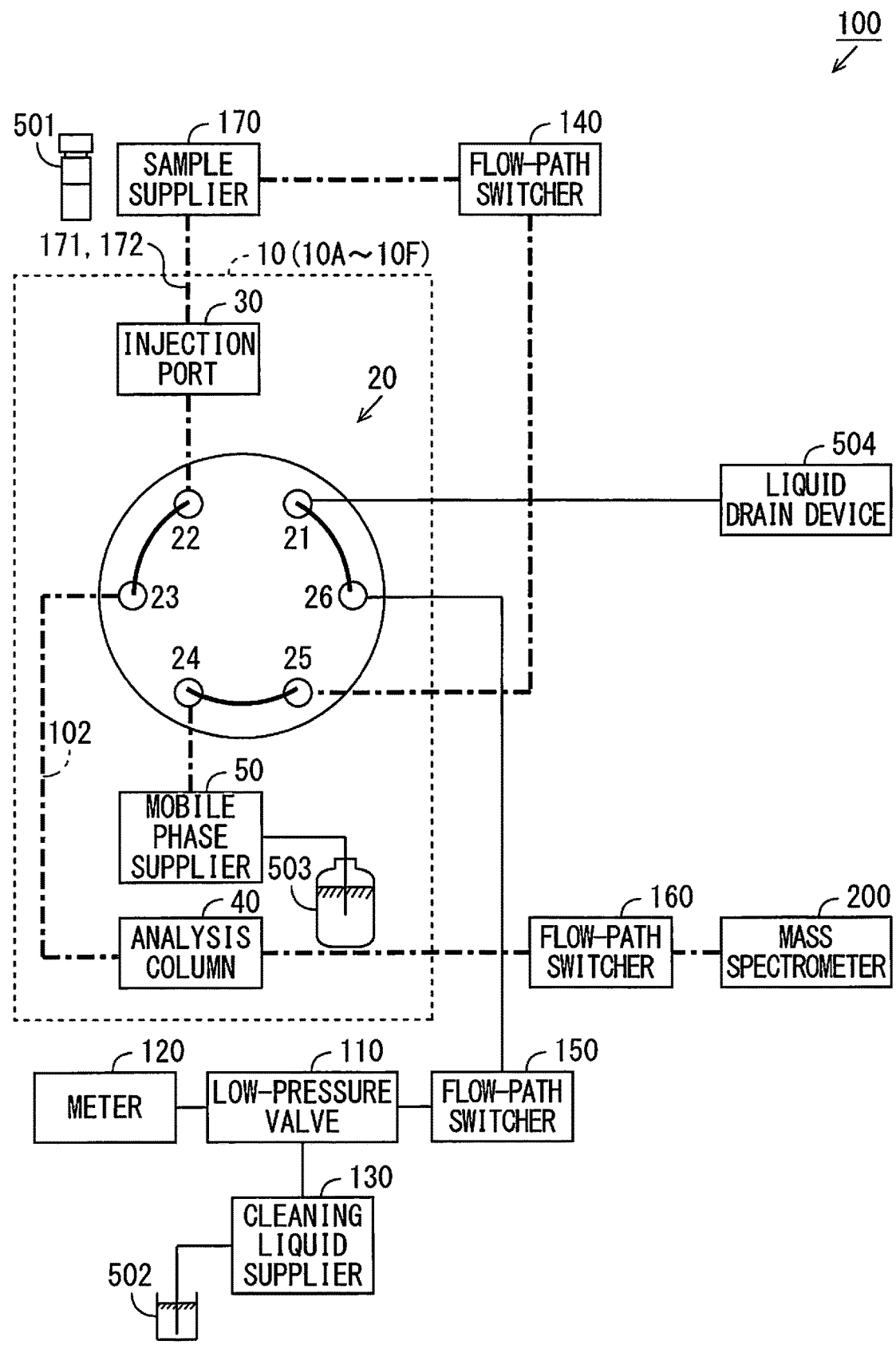
FIG. 6 is a diagram for explaining the running of the chromatograph during measurement.
Figure 7:
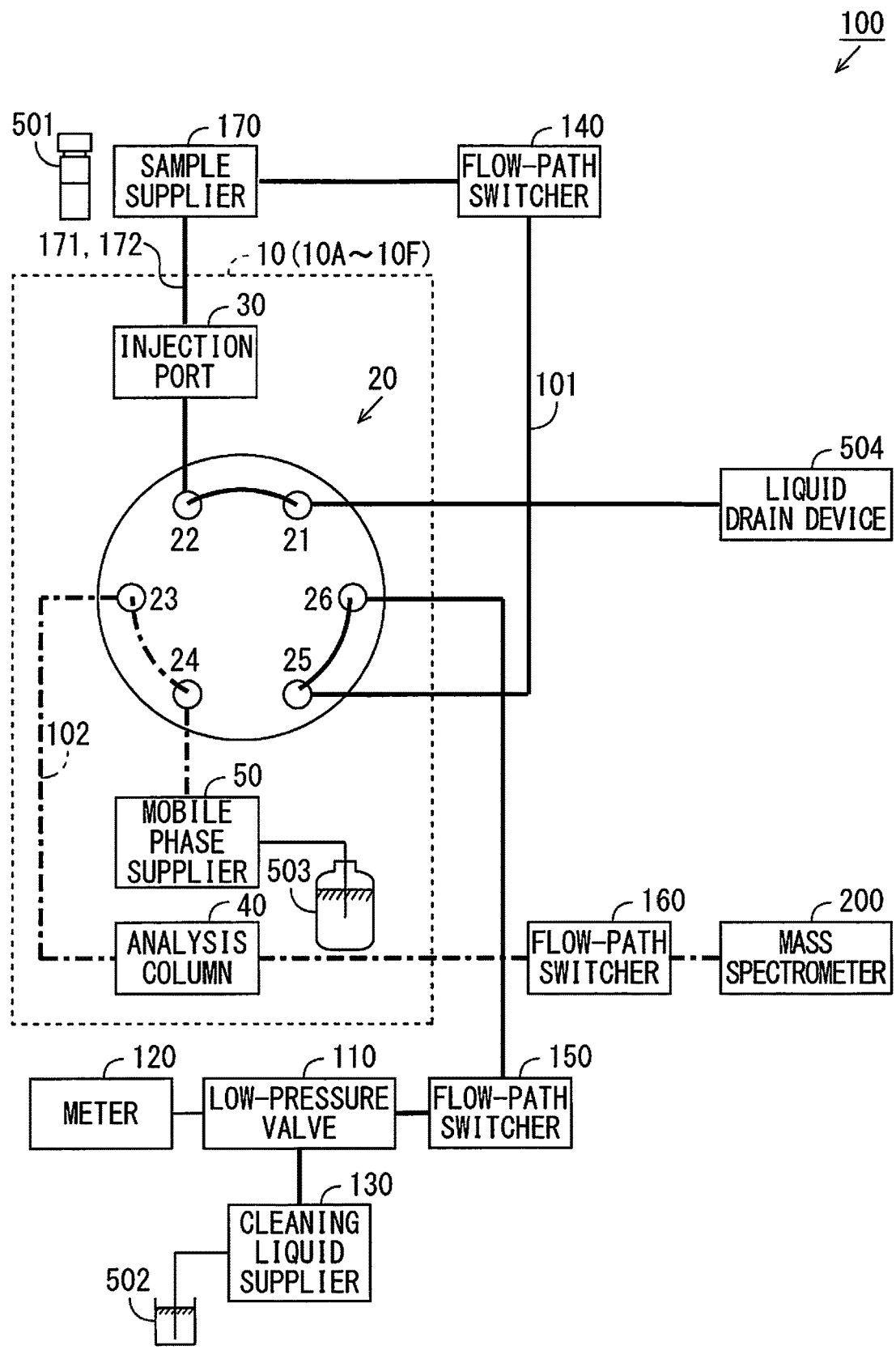
FIG. 7 is a diagram for explaining the running of the chromatograph during measurement.

FIGS. 5 to 7 are diagrams for explaining the running of the chromatograph 100 during measurement. As shown in FIG. 5, during measurement of a sample after the pre-processing, the needle 171 of the sample supplier 170 is inserted into the sample container 501, and the ports 111, 113 of the low-pressure valve 110 are connected to each other. In this state, the meter 120 is driven, so that a predetermined volume of sample is retained in the sample loop 172. Next, as shown in FIG. 6, the needle 171 of the sample supplier 170 is inserted into the injection port 30, and the high-pressure valve 20 is switched to the second connection state. Further, the ports 112, 113 of the low-pressure valve 110 are connected to each other.

In this case, as indicated by the thick one-dot and dash lines in FIG. 6, the mobile phase supplier 50 and the mass spectrometer 200 are connected to each other by a predetermined flow path (hereinafter referred to as a measurement flow path 102). The measurement flow path 102 includes the ports 24, 25 of the high-pressure valve 20, the flow-path switcher 140, the sample supplier 170, the injection port 30, the ports 22, 23 of the high-pressure valve 20, the analysis column 40 and the flow-path switcher 160. In this case, a mobile phase contained in the mobile phase container 503 is supplied to the measurement flow path 102 by the mobile phase supplier 50. Thus, a sample is supplied to the mobile phase in the sample supplier 170.

The sample that has been supplied to the mobile phase is separated into components and eluted in the analysis column 40. The sample eluted from the analysis column 40 is detected by the mass spectrometer 200. After a predetermined period of time elapses, the high-pressure valve 20 is switched to the first connection state as shown in FIG. 7. In this case, measurement of a sample continues while the sample supplier 170 is disconnected from the measurement flow path 102.

In this connection state, similarly to the pre-processing of FIG. 4, the cleaning liquid supplier 130 and the liquid drain device 504 are connected to each other by the cleaning flow path 101. Here, the cleaning liquid contained in the cleaning liquid container 502 is supplied to the cleaning flow path 101 by the cleaning liquid supplier 130. Thus, the inside of the cleaning flow path 101 is cleaned by the cleaning liquid while measurement of the sample continues. Further, pre-processing can be executed in one channel 10 while measurement of the sample continues in another channel 10. This improves efficiency of measurement more sufficiently.

In this manner, the high-pressure valve 20 is switched between the first connection state and the second connection state. In the first connection state, a mobile phase supplied by the mobile phase supplier 50 is guided to the analysis column 40 through the sample supplier 170. In the second connection state, a cleaning liquid that has been supplied by the cleaning liquid supplier 130 is guided to the sample supplier 170 while a mobile phase that has been supplied by the mobile phase supplier 50 is guided to the analysis column 40 without going through the sample supplier 170.

Figure 8:
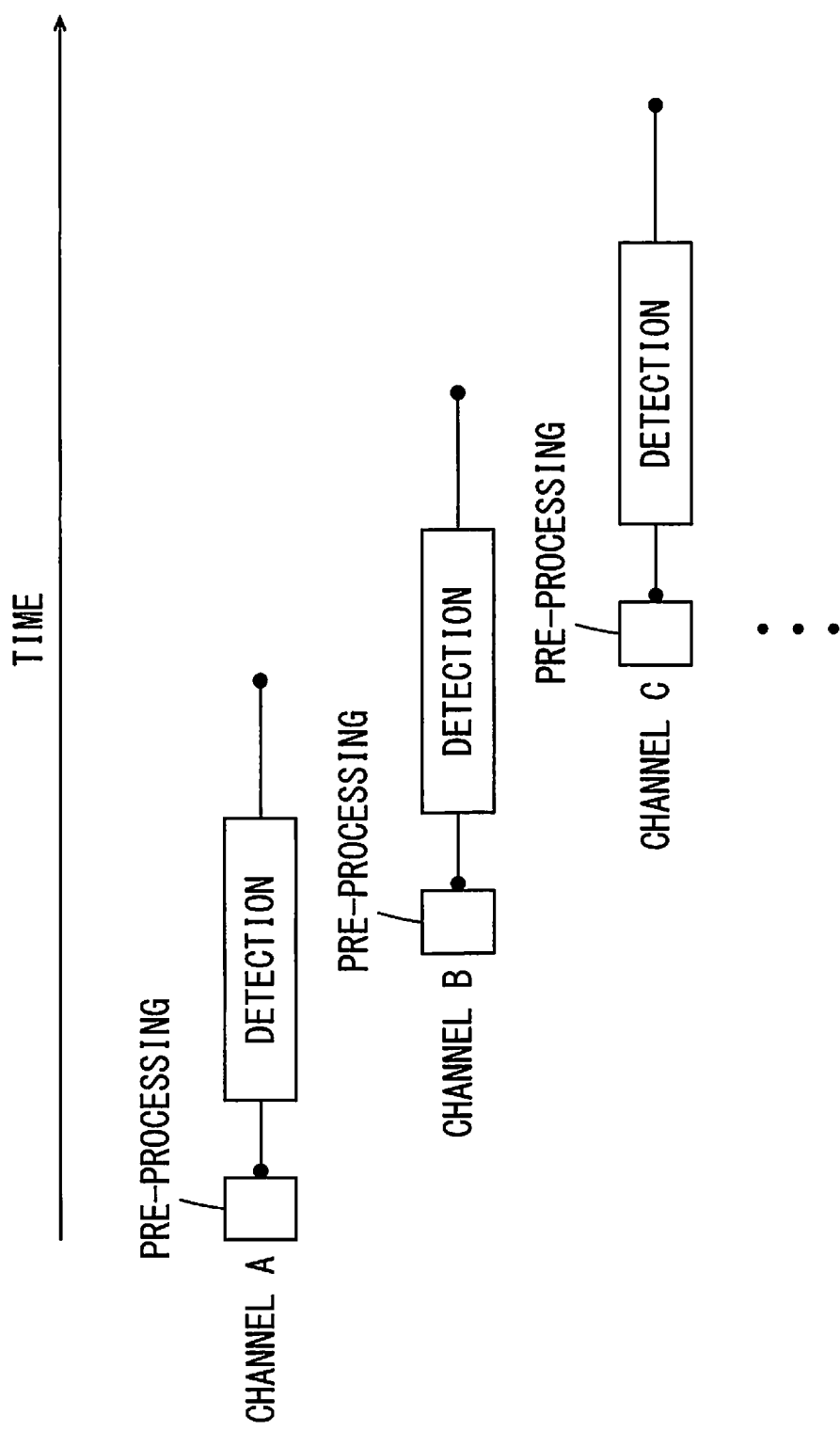
FIG. 8 is a time flow showing the running procedure of the chromatograph.

FIG. 8 is a time flow showing representing the running procedure of the chromatograph 100. As shown in FIG. 8, the chromatograph 100 repeats the pre-processing and measurement of sample of FIGS. 4 to 7 using the plurality of channels 10 that are to be sequentially selected. Samples that flow from the plurality of channels 10 are detected by the mass spectrometer 200 in different periods. Further, pre-processing in each channel 10 is executed in a sample detection period in the previous channel 10. This improves a throughput.

(3) Analysis Control Device

Figure 9:
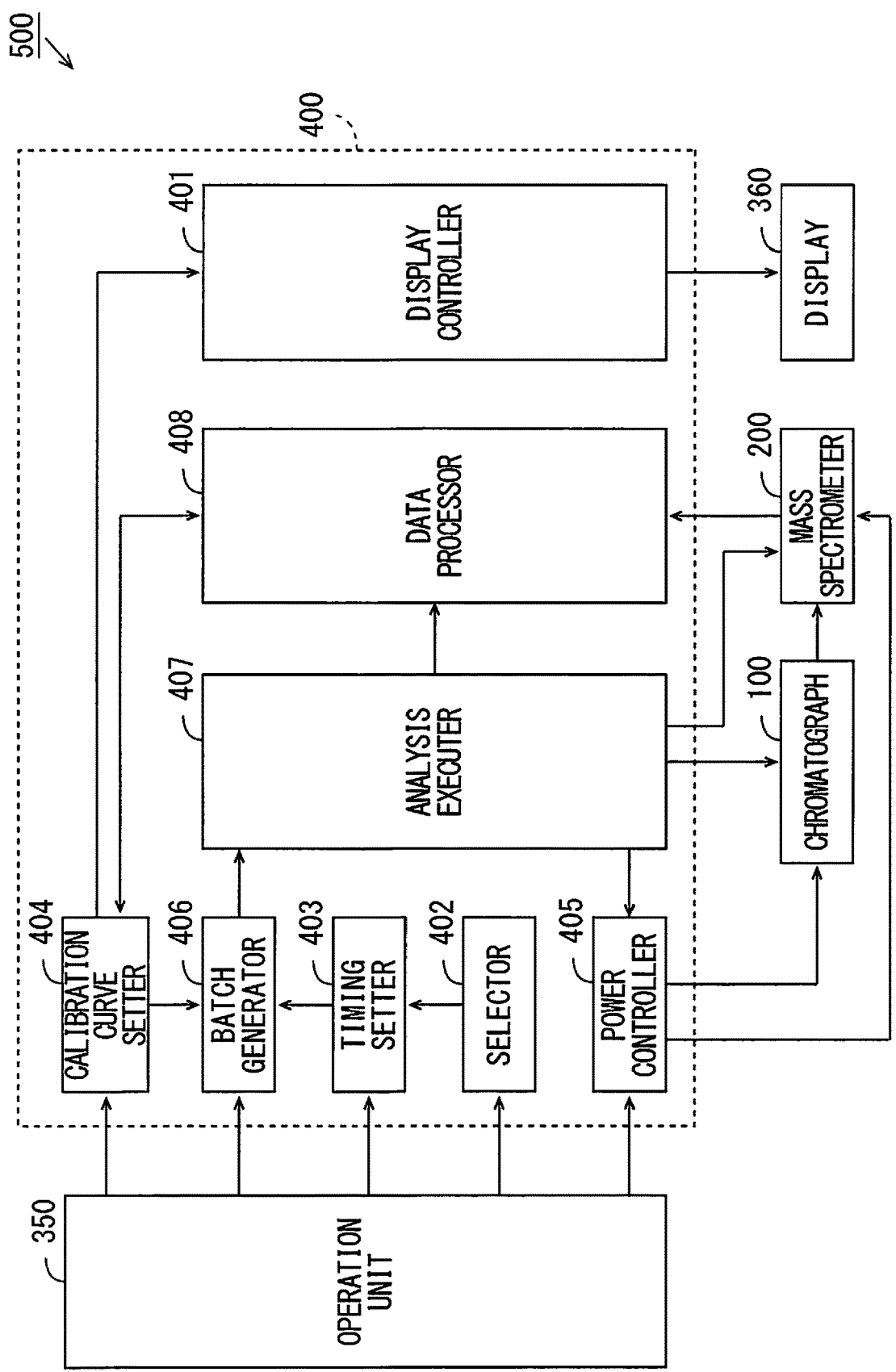
FIG. 9 is a diagram showing the configuration of an analysis control device.

FIG. 9 is a diagram showing the configuration of the analysis control device 400. As shown in FIG. 9, the analysis control device 400 includes a display controller 401, a selector 402, a timing setter 403, a calibration curve setter 404, a power controller 405, a batch generator 406, an analysis executer 407 and a data processor 408 as functions. The controller 310 of FIG. 1 executes an analysis control program stored in the storage 340 or the like, whereby functions of the analysis control device 400 are implemented. Part or all of the functions of the analysis control device 400 may be implemented by hardware such as an electronic circuit.

The display controller 401 causes the display 360 to display various control screens in regard to the control of the plurality of channels 10 of the chromatograph 100. Part of the control screens functions as a GUI for causing a user to provide predetermined input or make selection using the operation unit 350. An example of a control screen will be described below. The selector 402 receives designation of a channel 10 to be used for measurement from the operation unit 350. The user can designate a channel 10 to be used for measurement through a GUI displayed in the display 360 by operating the operation unit 350. The selector 402 selects the received channel 10.

The timing setter 403 receives running periods of the sample supplier 170, the channel 10 selected by the selector 402, the mass spectrometer 200 and the data processor 408. That is, the timing setter 403 functions as an input element to which the above-mentioned running periods are to be input. The running period of the sample supplier 170 includes an execution period for pre-processing. The timing setter 403 can receive an injection amount of a sample to be injected into the injection port 30 of the channel 10 of FIG. 3 from the sample supplier 170.

The user can input the above-mentioned running period and an injection amount of sample through the GUI displayed in the display 360 by operating the operation unit 350. The timing setter 403 sets the running points in time of the sample supplier 179, the plurality of channels 10, the mass spectrometer 200 and the data processor 408 based on the received running periods (hereinafter referred to as a timing setting). Thus, a point in time at which a sample is to be injected by the sample supplier 170, a point in time at which a sample derived from any channel 10 is to be detected in the mass spectrometer 200 and a period in which a signal that is output from the mass spectrometer 200 due to detection of a sample is to be processed in the data processor 208 are set. Further, the timing setter 403 sets an injection amount of a received sample.

The calibration curve setter 404 receives selection between a setting for creation of a calibration curve individually corresponding to one or more channels 10 out of the plurality of channels 10 and a setting for creation of a calibration curve commonly corresponding to two or more channels 10 out of the plurality of channels 10. The user can select a setting for creation of a calibration curve corresponding to a desired channel 10 (hereinafter referred to as a calibration curve setting) by operating the operation unit 350. The display controller 401 causes the display 360 to display a screen showing the calibration curve setting selected in the calibration curve setter 404 as a control screen.

The processing device 300 is shut down in a case where an abnormality occurs in the analysis system 500, a predetermined period of time elapses since an analysis based on a batch file (hereinafter referred to as a batch analysis) ends, etc. The power controller 405 receives a setting for a constituent element, to be powered off when a batch analysis ends, out of the various constituent elements of the analysis system 500 and a setting for a constituent element, to be powered off when the processing device 300 is shut down, out of the various constituent elements of the analysis system 500. The constituent elements of the analysis system 500 include a degassing device of the cleaning liquid supplier 130, the high-pressure pump of the mobile phase supplier 50, the column oven containing the analysis column 40, the sample supplier 170 or the mass spectrometer 200, for example.

The user can select a constituent element to be powered off when a batch analysis ends as a first subject element and can select a constituent element to be powered off when the analysis system 500 is shut down as a second subject element through the GUI displayed in the display 360 by operating the operation unit 350. The power controller 405 powers off the first subject element or the second subject element in accordance with the received setting (hereinafter referred to as a shut-down setting).

The batch generator 406 receives information and an analysis condition in regard to a sample that is used in each of the plurality of channels 10 from the operation unit 350. The user can input information and an analysis condition in regard to a sample to be used in each of the plurality of channels 10 through the GUI displayed in the display 360 by operating the operation unit 350. The batch generator 406 generates a batch file for controlling an analysis sequence based on the received information and analysis condition in regard to the sample. A batch file may be generated for each channel 10.

In the present embodiment, a sample to be measured and the timing setting performed by the timing setter 403 are associated with each other as a group, and the name is provided to the group. Further, in a case where a sample is a standard sample, the calibration curve setting performed by the calibration curve setter 404 may further be included in the group. The batch generator 406 generates a batch file further using a group selected by the user.

The analysis executer 407 controls the running of the chromatograph 100, the mass spectrometer 200 and the data processor 408 such that pre-processing, measurement of a sample, detection of a sample and data processing are executed sequentially based on a batch file generated by the batch generator 406. Thus, a batch analysis is performed. The configuration of the analysis executer 407 will be described below.

The data processor 408 acquires detection data of sample from the mass spectrometer 200 and processes the data. Thus, an MS chromatogram is generated, a QC value is calculated, etc. Further, the data processor 408 functions as a calibration curve creator, and creates a calibration curve to be used in a channel 10 based on the calibration curve setting performed in the calibration curve setter 404 and a result of detection obtained when a standard sample is supplied to the channel 10 relating to the setting. Thus, quantification of detection data is performed.

Figure 10:
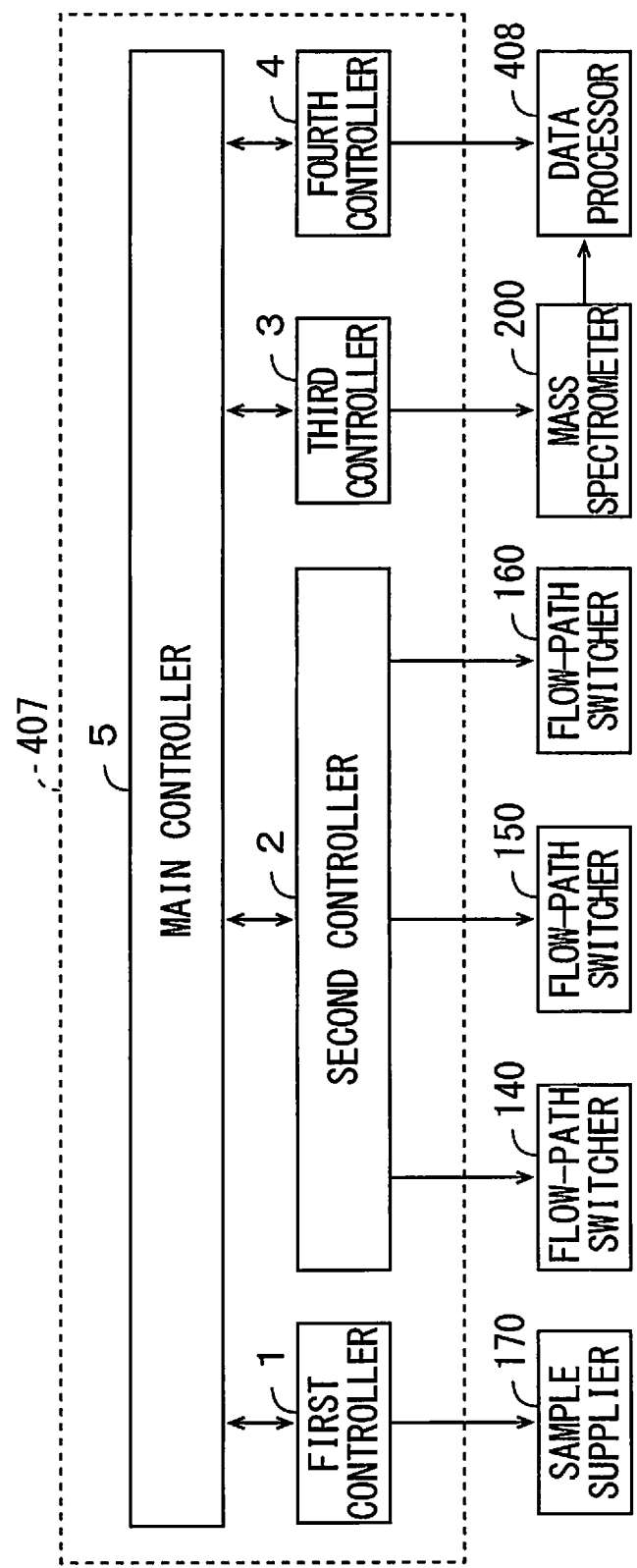
FIG. 10 is a diagram showing the function blocks of an analysis executer of FIG. 9.

FIG. 10 is a diagram showing the function block of the analysis executer 407 of FIG. 9. As shown in FIG. 10, the analysis executer 407 includes a first controller 1, a second controller 2, a third controller 3, a fourth controller 4 and a main controller 5. As described above, in the present embodiment, the controller 310 of FIG. 1 includes a plurality of CPUs, for example. Each of the first controller 1, the second controller 2, the third controller 3, the fourth controller 4 and the main controller 5 is implemented by execution of an analysis control program by another CPU.

The first controller 1 mainly controls the sample supplier 170 such that the sample supplier 170 supplies a sample. The second controller 2 mainly controls the flow-path switchers 140, 150 such that a sample to be supplied by the sample supplier 170 is guided to one of the plurality of channels 10. Further, the second controller 2 controls the flow-path switcher 160 such that a sample that flows from the channel 10 is guided to the mass spectrometer 200.

The third controller 3 controls the mass spectrometer 200 such that the mass spectrometer 200 detects a sample guided from the above-mentioned channel 10. The fourth controller 4 controls the data processor 408 such that the data processor 408 processes detection data of a sample that is obtained by the mass spectrometer 200. The main controller 5 controls the running of the first controller 1, the second controller 2, the third controller 3 and the fourth controller 4 in accordance with the timing setting performed by the timing setter 403 of FIG. 9.

With the above-mentioned configuration, the first controller 1, the second controller 2, the third controller 3, the fourth controller 4 and the main controller 5 are implemented by another CPU, thereby being capable of running independently from one another. Thus, the sample supplier 170, the plurality of channels 10, the mass spectrometer 200 and the data processor 408 can run in parallel without interfering with an analysis.

In a case where a channel 10 is to be added, the CPU executes control software that is installed to correspond to the channel 10 to be added. Thus, the second controller 2 is updated. Further, authentication of the main controller 5 and the updated second controller 2 completes, so that the channel 10 becomes usable. In this manner, it is possible to add a channel 10 only by adding the control software, and it is not necessary to expand the controller 310. Therefore, the analysis system 500 can be easily and efficiently utilized.

(4) Control Screens

Figure 11:
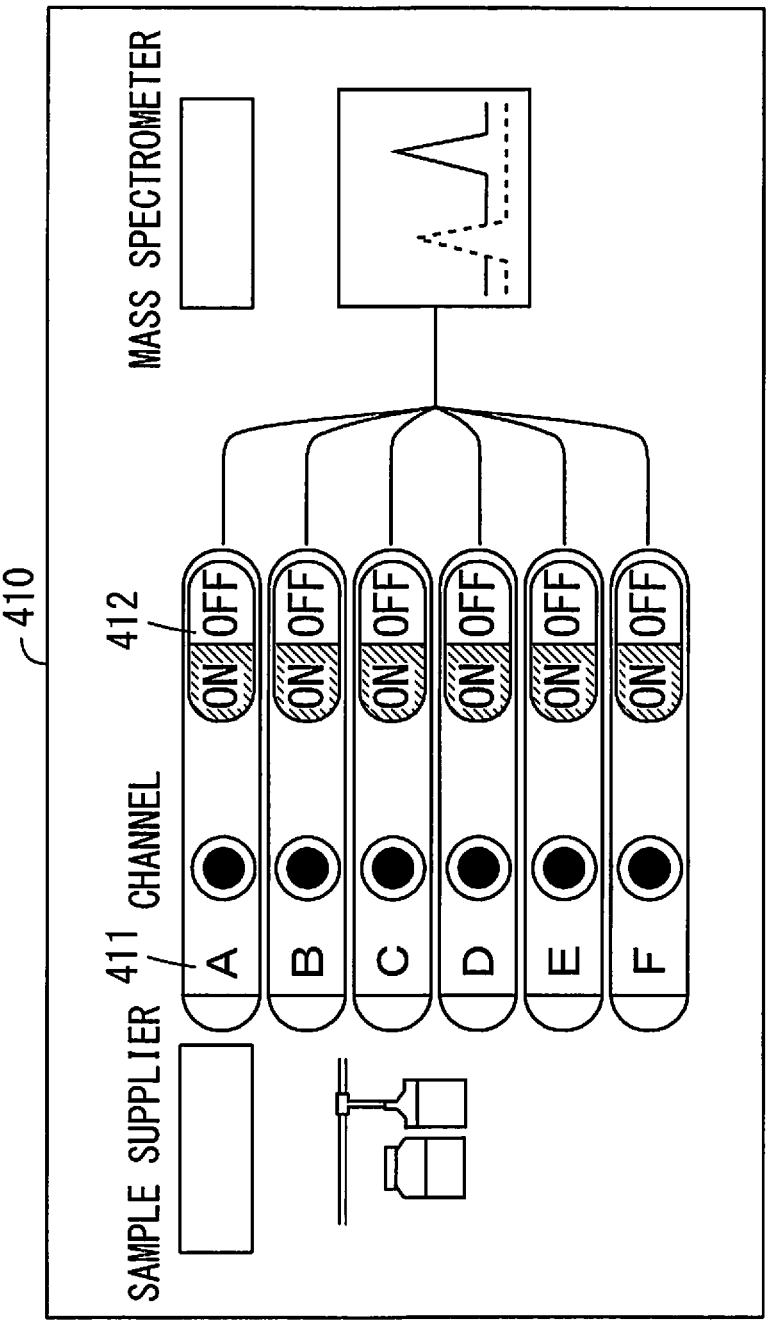
FIG. 11 is a diagram showing one example of a first control screen.

A control screen to be displayed in the display 360 by the display controller 401 of FIG. 9 will be described, by way of example. FIG. 11 is a diagram showing one example of a first control screen. As shown in FIG. 11, a plurality of icons 411 respectively corresponding to the plurality of channels 10 are displayed in the first control screen 410. Further, in the first control screen 410, a plurality of buttons 412 respectively corresponding to the plurality of channels 10 are displayed.

Any channel 10 may be unusable due to an occurrence of error, etc. Whether each channel 10 is usable can be determined by the selector 402 of FIG. 9 with use of a detector that detects an analysis condition of each channel 10. The detector includes a sensor for detecting a signal to be output during an analysis, a sensor for detecting a driving condition of the high-pressure pump of the mobile phase supplier 50 or the like.

In the first control screen 410, an icon 411 corresponding to a channel 10 in a usable state and an icon 411 corresponding to a channel 10 in an unusable state are displayed to be distinguishable. Thus, the user can easily identify a channel 10 in a usable state.

While an icon 411 corresponding to a channel 10 in an unusable state greys out in the present embodiment, the embodiment is not limited to this. An icon 411 corresponding to a channel 10 in an unusable state does not have to be displayed in the first control screen 410. The user can designate a channel 10 to be used for measurement by switching a button 412 corresponding to a desired channel 10 to ON. The selector 402 of FIG. 9 selects a channel 10 to be used for measurement based on a designation made by the user.

FIG. 12 is a diagram showing one example of a second control screen. As shown in FIG. 12, pull-down menus 421, 422, 423, etc. are displayed in the second control screen 420. The pull-down menus 421 to 423, etc. are operated, so that analysis conditions to be used for an analysis such as the sample supplier 170, the mass spectrometer 200, an analysis method and so on are input.

Figure 13:
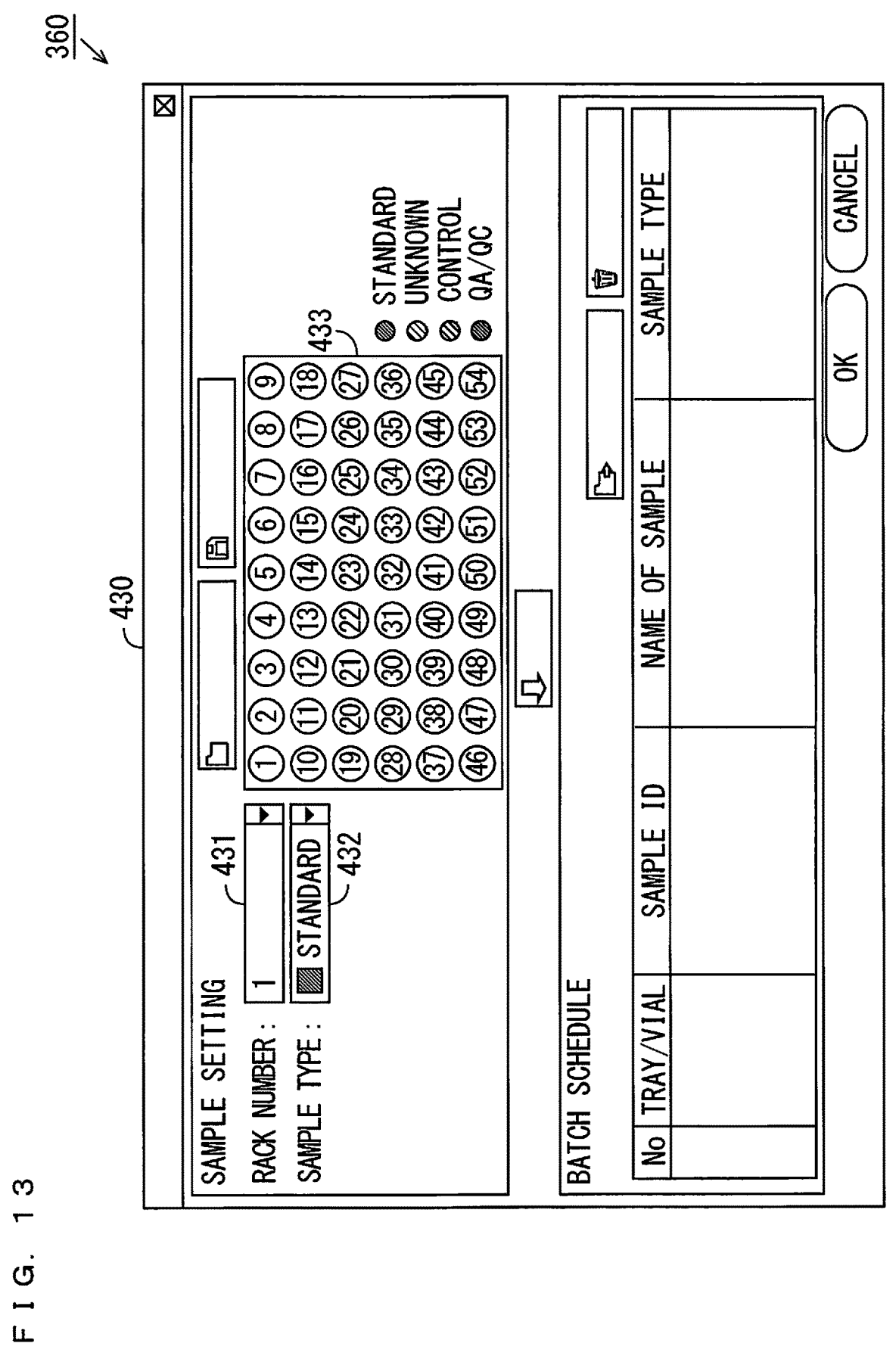

FIG. 13 is a diagram showing one example of a third control screen. As shown in FIG. 13, in the third control screen 430, pull-down menus 431, 432, etc. are displayed. When the pull-down menu 431 is operated, one of a plurality of racks respectively holding a plurality of sample containers (vials) is selected, and an image 433 representing the selected rack is displayed in the third control screen 430. In the example of FIG. 13, the selected rack holds fifty four sample containers 501.

One container out of the sample containers on the image 433 is operated, so that the sample container is selected as a sample container to be used for measurement. Further, the pull-down menu 432 is selected, so that a type of a sample contained in the selected sample container is selected. A sample type includes a standard sample, an unknown sample, a control sample and a QA/QC (Quality Assurance/Quality Control) sample.

The batch generator 406 of FIG. 9 generates a batch file based on an analysis condition input to the second control screen 420 and sample information input to the third control screen 430. A batch file has a table format. A generated batch file may include a specific number of a rack, a specific number of a sample container, a name of group and so on (see FIG. 17).

Figure 14:
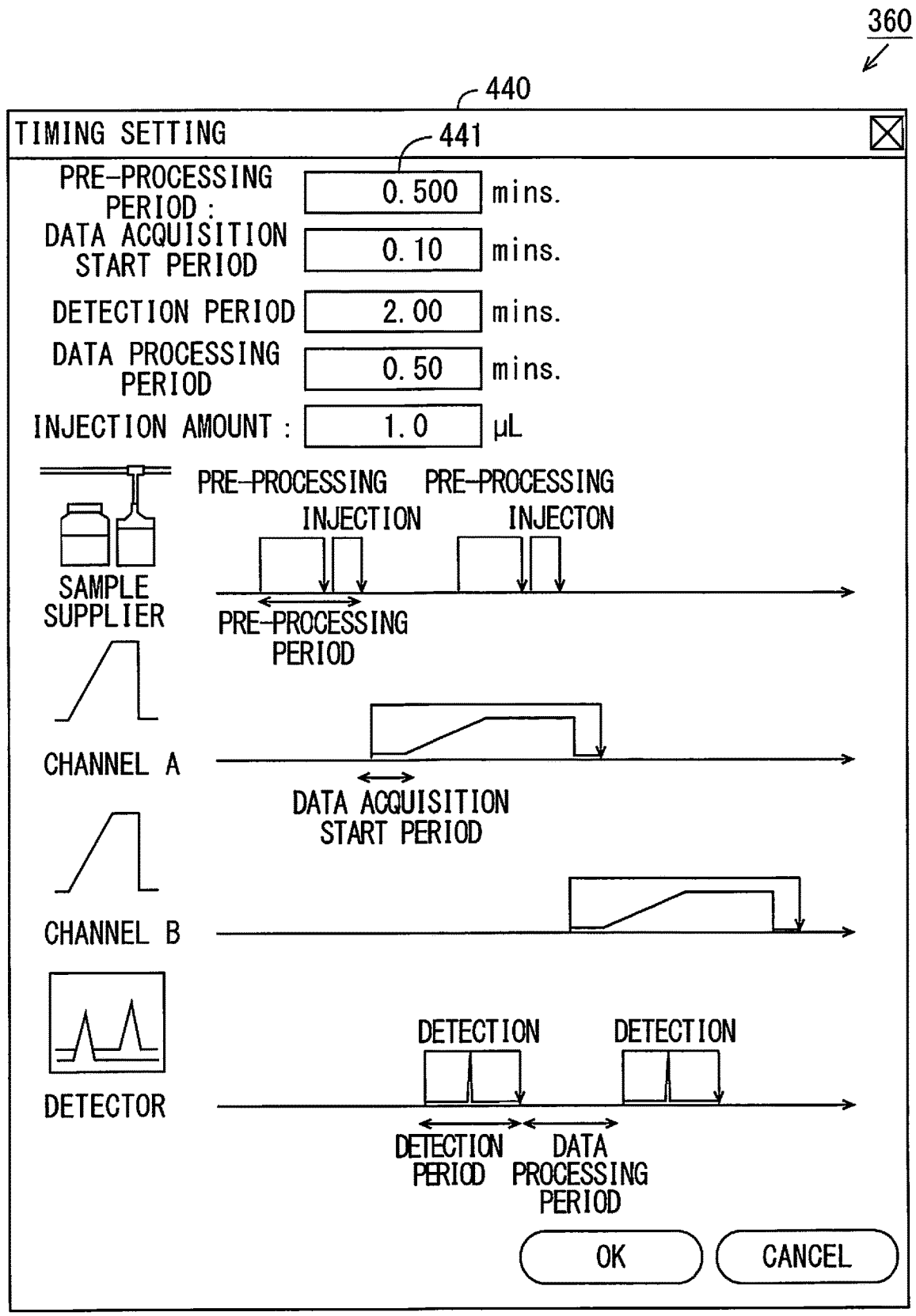
FIG. 14 is a diagram showing one example of a fourth control screen.

FIG. 14 is a diagram showing one example of a fourth control screen. As shown in FIG. 14, a plurality of input fields 441 are displayed in the fourth control screen 440. A pre-processing period, a data acquisition period, a detection period, a data processing period, etc. are input to the plurality of input fields 441. The timing setter 403 of FIG. 9 sets the running periods of the sample supplier 170, the plurality of channels 10, the mass spectrometer 200 and the data processor 408 based on the input periods.

Further, in the fourth control screen 440, the graphs of the running periods of the sample supplier 170, the plurality of channels 10, the mass spectrometer 200 and the data processor 408 are displayed based on the input periods. In the example of FIG. 14, the running periods of not all of the channels 10 but two channels 10 selected by the selector 402 are displayed. The user can easily input each period by viewing the graphs displayed in the fourth control screen 440 such that measurement to be performed by the plurality of channels 10 is not interfered.

Figure 15:
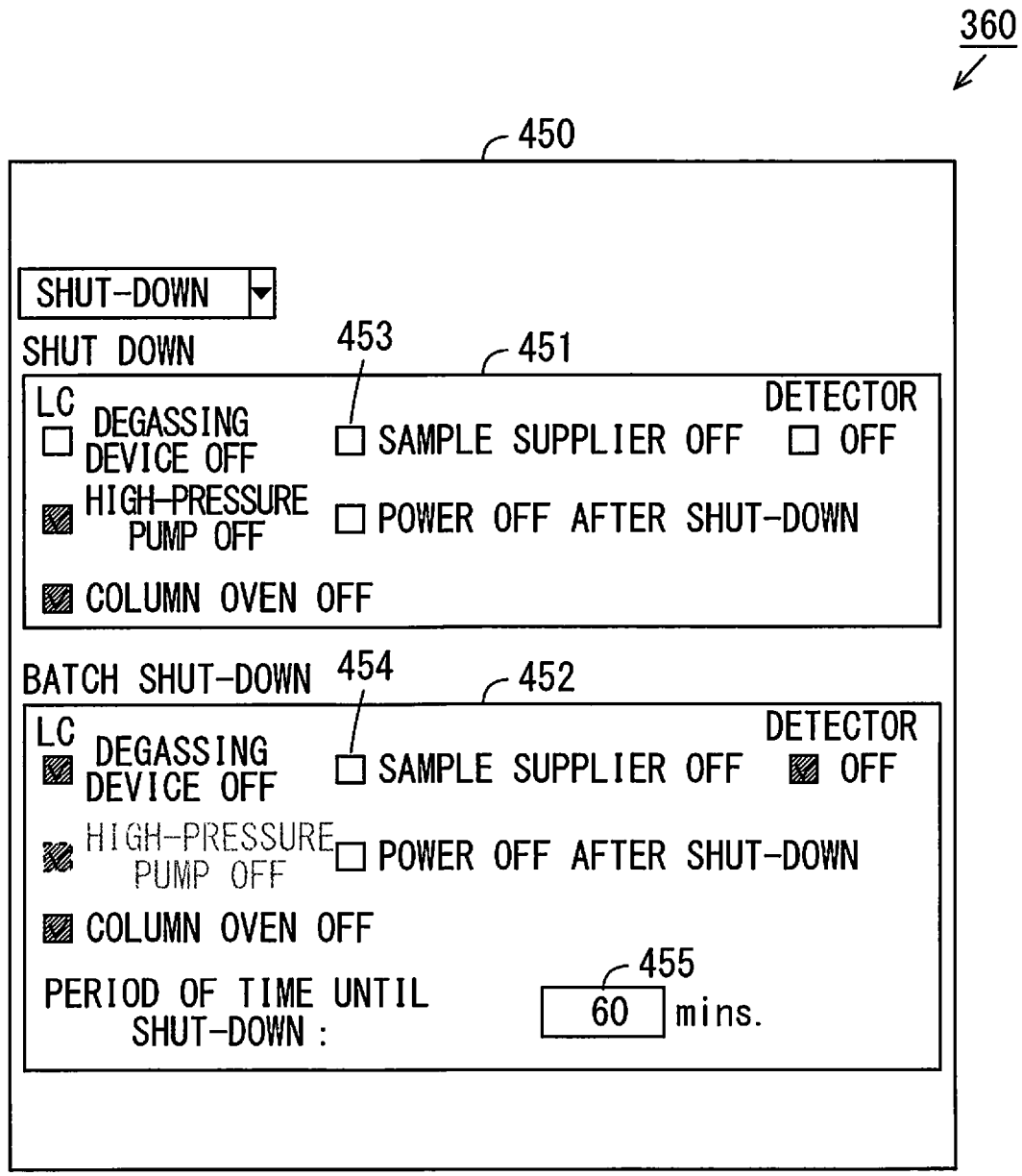
FIG. 15 is a diagram showing one example of a fifth control screen.

FIG. 15 is a diagram showing one example of a fifth control screen. The fifth control screen 450 is a screen for receiving the shut-down setting. As shown in FIG. 15, display regions 451, 452 are provided in the fifth control screen 450. In the display region 451, a plurality of check boxes 453 are displayed. The plurality of check boxes 453 respectively correspond to the degassing device, the high-pressure pump, the column oven, the sample supplier 170 and the mass spectrometer 200. When one or more check boxes 453 are checked, the constituent elements corresponding to the check boxes 453 are selected as second subject elements.

In the display region 452, a plurality of check boxes 454 and an input field 455 are displayed. The plurality of check boxes 454 respectively correspond to the degassing device, the high-pressure pump, the column oven, the sample supplier 170 and the mass spectrometer 200. One or more check boxes 454 are checked, so that constituent elements corresponding to the check boxes 454 are selected as first subject elements. In the input field 455, a period of time from the end of a batch analysis to the shut-down of the analysis system 500 is input.

Part of the constituent elements such as the high-pressure pump requires a relatively long period of time to be in a stable state after power-ON. Further, in the high-pressure pump, the useful life may be prolonged if the high-pressure pump is constantly pulsing. Therefore, in the display region 452 of the present embodiment, the check box 454 corresponding to the high-pressure pump greys out to prevent the high-pressure pump from being selected as a first subject element.

FIG. 16 is a diagram showing one example of a sixth control screen. As shown in FIG. 16, in the sixth control screen 460, whether creation of a calibration curve individually corresponding to one or more channels 10 or creation of a calibration curve commonly corresponding to two or more channels 10 is set by the calibration curve setter 404 of FIG. 9 is shown. In the example of FIG. 16, high-lighting indicates that a setting for creation of calibration curves respectively corresponding to two channels 10 has been made.

Figure 17:
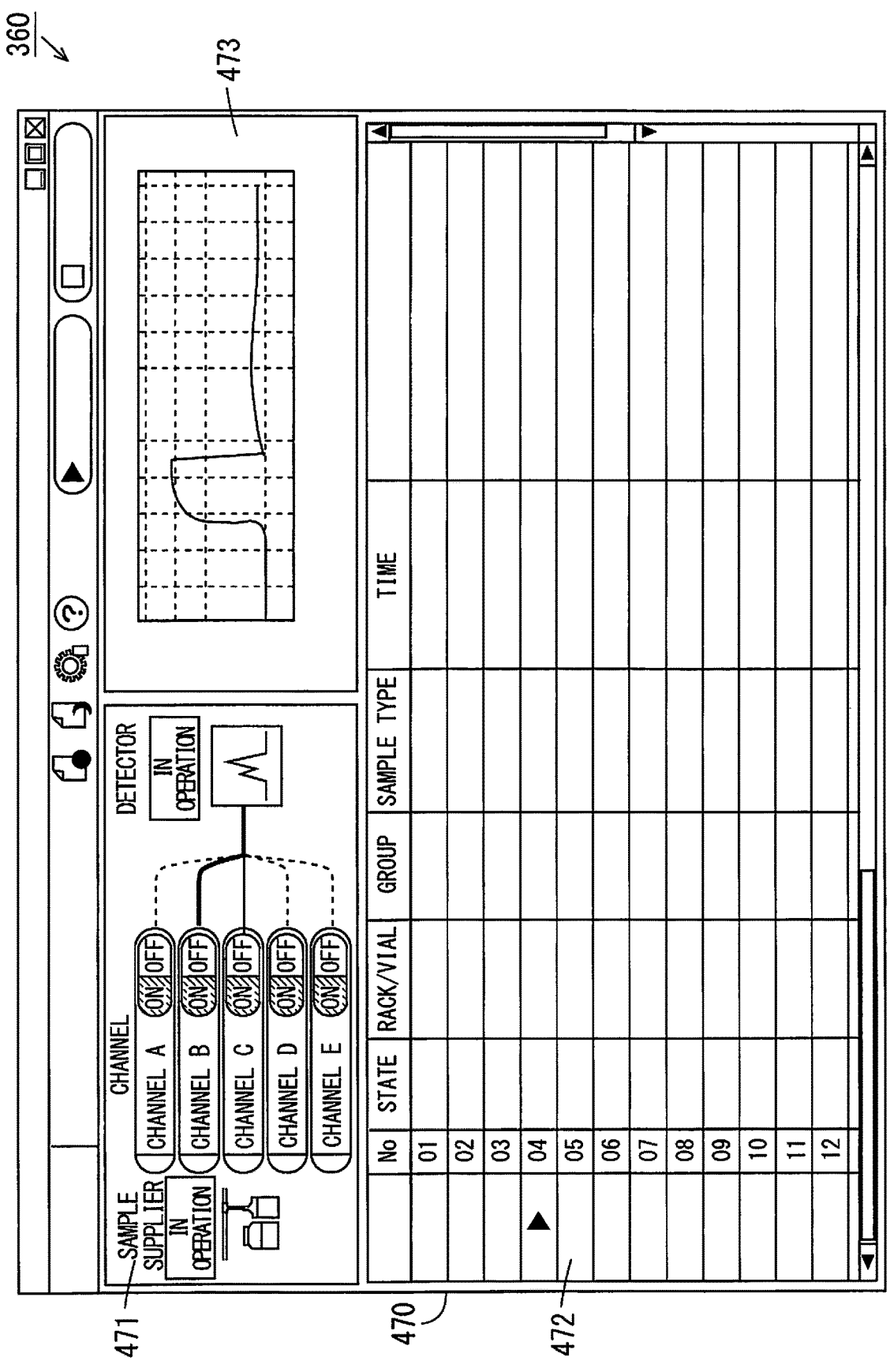
FIG. 17 is a diagram showing one example of a seventh control screen.

FIG. 17 is a diagram showing one example of a seventh control screen. As shown in FIG. 17, in the seventh control screen 470, display regions 471, 472, 473 are provided. In the display region 471, a flow-path diagram showing the current connection state of the channels 10 is shown. As the measurement proceeds, the display is updated such that which channel 10 is being used can be found.

In the example of FIG. 17, the connection between a currently used channel 10 and the mass spectrometer 200 is indicated by a thick solid line. Further, the connection between a channel 10 to be used in the next measurement and the mass spectrometer 200 is indicated by a thin solid line. In the display region 471, the ports of the flow-path switchers 140, 150 to which each channel 10 is connected may be displayed.

In the display region 472, a table of a batch file generated by the batch generator 406 of FIG. 9 is shown. In the display region 472, a cursor may be displayed in the row corresponding to the current stage of progress in an analysis sequence. In the display region 473, a change in pressure in the high-pressure pump of a currently used channel 10 is shown. In the display region 473, a change in pressure in the high-pressure pump for each channel 10 may be shown.

As an example of another control screen, a control screen may be a screen for receiving a gradient condition in each channel 10. Alternatively, a control screen may be a screen for displaying details of an error of a channel 10. Details of an error includes an abnormality of the high-pressure pump, arrival of replacement time of consumables, etc. In the control screen, distribution of a QC value for each sample may be shown. Further, in the control screen, a generated MS chromatogram may be shown in real time for each channel 10. Alternatively, in the control screen, a plurality of MS chromatograms may be displayed in a superimposed manner.

(5) Analysis Process

Figure 18:
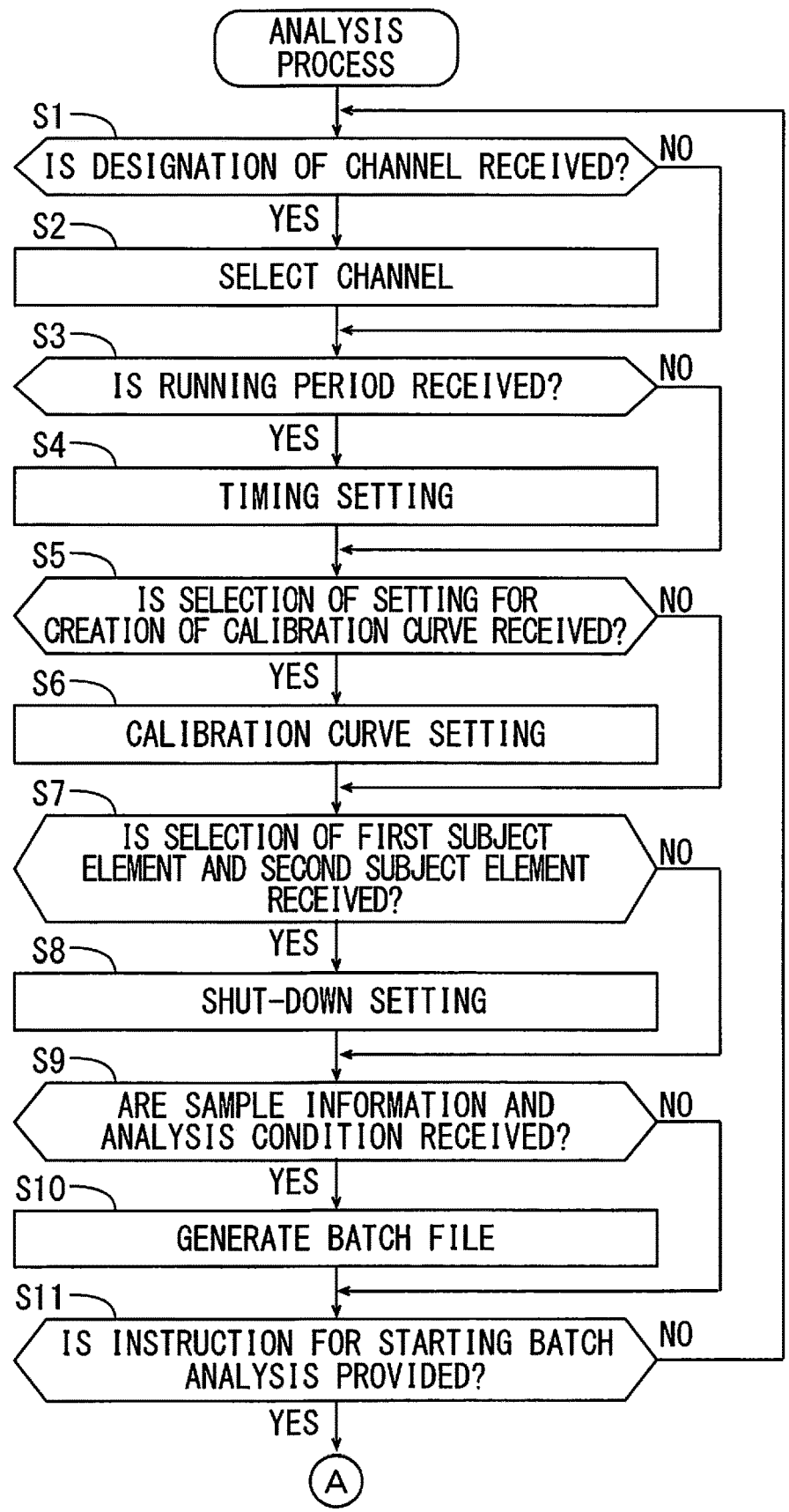
FIG. 18 is a flowchart showing the algorithm of an analysis process to be executed by an analysis control program.
Figure 19:
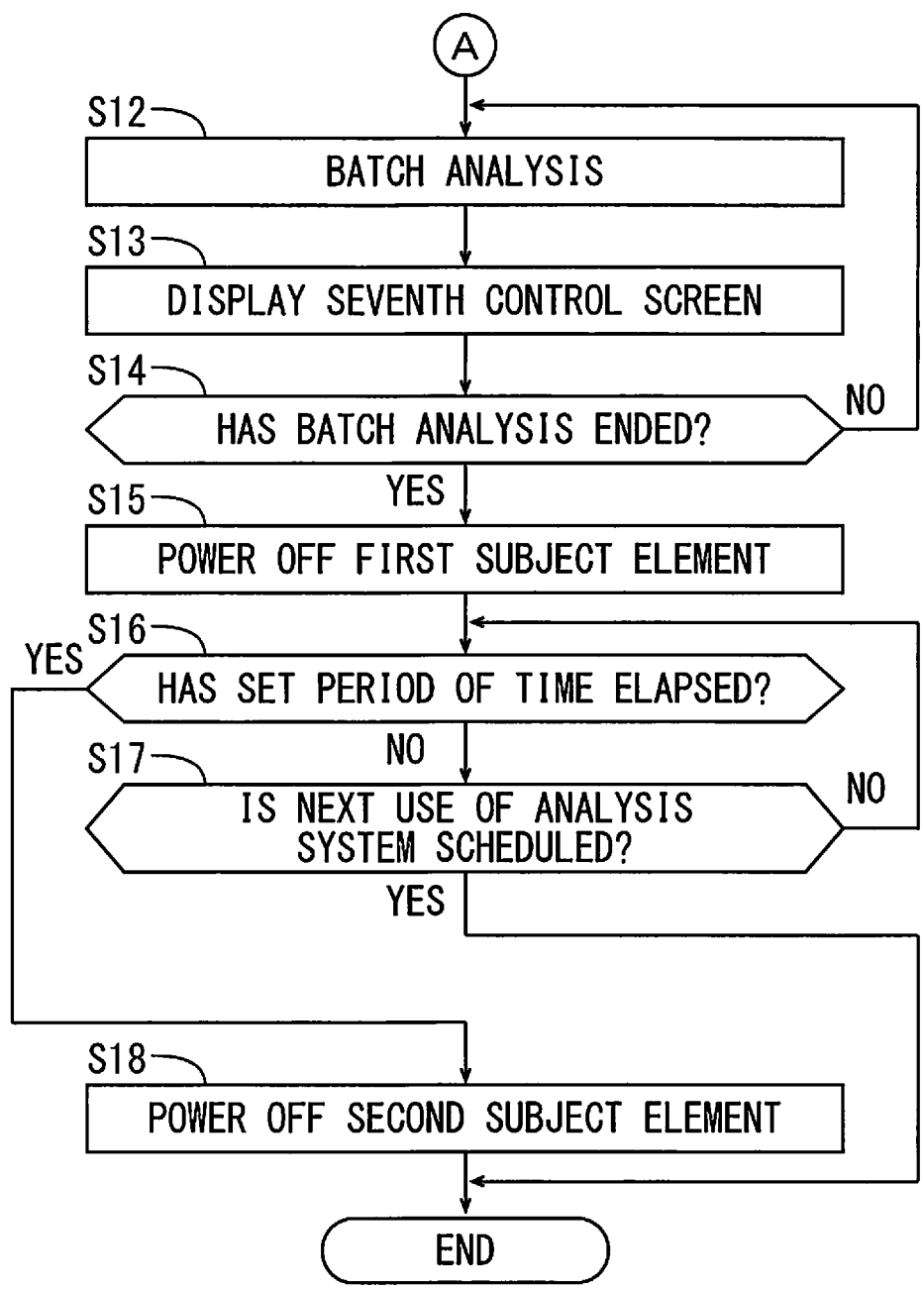
FIG. 19 is a flowchart showing the algorithm of the analysis process to be executed by the analysis control program.

FIGS. 18 and 19 are flowcharts showing the algorithm of an analysis process to be executed by the analysis control program. The analysis process will be described below with reference to the analysis control device 400 of FIG. 9 and the flowcharts of FIGS. 18 and 19. First, the selector 402 determines whether designation of one or more channels 10 has been received (step S1). This designation can be received from the first control screen 410 of FIG. 11. In a case where designation of a channel 10 is not received, the selector 402 proceeds to the step S3.

In a case where designation of a channel 10 is received, the selector 402 selects the channel 10 as a channel 10 to be used for measurement (step S2) and proceeds to the step S3. While the selector 402 selects a channel 10 as a channel 10 to be used for measurement by receipt of designation of the channel 10, the embodiment is not limited to this. The selector 402 may determine whether each channel 10 is in a usable state using the above-mentioned detector and may preferentially select the determined channel 10. In this case, the step S1 is not performed.

In the step S3, the timing setter 403 determines whether the running periods of the sample supplier 170, a channel 10 selected in the step S1, the mass spectrometer 200 and the data processor 408 have been received (step S3). These running periods can be received from the fourth control screen 440 of FIG. 14. In a case where the running periods are not received, the timing setter 403 proceeds to the step S5. In a case where the running periods are received, the timing setter 403 performs a timing setting based on the running periods (step S4) and proceeds to the step S5.

In the step S5, the calibration curve setter 404 determines whether selection of a setting for creation of a calibration curve has been received (step S5). In a case where selection is not received, the calibration curve setter 404 proceeds to the step S7. In a case where selection is received, the calibration curve setter 404 performs a calibration curve setting based on the selection (step S6) and proceeds to the step S7. After the step S6, the display controller 401 may cause the display 360 to display the sixth control screen 460 of FIG. 16 showing the executed calibration curve setting.

In the step S7, the power controller 405 determines whether selection of a first subject element and a second subject element has been received (step S7). This selection can be received from the fifth control screen 450 of FIG. 15. In a case where selection is not received, the power controller 405 proceeds to the step S9. In a case where selection is received, the power controller 405 performs a shut-down setting based on the selection (step S8) and proceeds to the step S9.

In the step S9, the batch generator 406 determines whether sample information and an analysis condition have been received (step S9). Sample information can be received from the third control screen 430 of FIG. 13, and an analysis condition can be received from the second control screen 420 of FIG. 12. In a case where sample information or an analysis condition is not received, the batch generator 406 proceeds to the step S11.

In a case where sample information and an analysis condition are received, the batch generator 406 generates a batch file based on the sample information and the analysis condition (step S10) and proceeds to the step S11. In the present embodiment, the timing setting performed in the step S4 and the calibration curve setting performed in the step S6 are also used for generation of a batch file.

In the step S11, the analysis executer 407 determines whether an instruction for starting a batch analysis has been provided (step S11). The user can provide an instruction for starting a batch analysis by performing a predetermined operation using the operation unit 350 after the steps S2, S4, S6, S8 and S10 are completed. In a case where an instruction for starting a batch analysis is not provided, the analysis executer 407 returns to the step S1. The steps S1 to S11 are repeated until an instruction for starting a batch analysis is provided. Therefore, the user can make various designation, selection or the like again.

In a case where an instruction for starting a batch analysis is provided, the analysis executer 407 performs a batch analysis in accordance with the batch file generated in the step S10 (step S12). Here, the display controller 401 causes the display 360 to display the seventh control screen 470 of FIG. 17 showing a table of the batch file generated in the step S10 and a flow-path diagram showing the connection state in regard to a currently used channel 10 (step S13).

Thereafter, the analysis executer 407 determines whether the batch analysis has ended (step S14). In a case where the batch analysis has not ended, the analysis executer 407 returns to the step S12. Thus, the batch analysis continues in the step S12, and the content of display in the seventh control screen 470 is updated in the step S13. The steps 12 to 14 are repeated until the batch analysis ends. The analysis executer 407 may receive an instruction for interrupting an analysis in regard to each channel 10. In this case, whether an analysis continues in regard to a channel 10 that is different from a channel 10 in regard to which an interrupting instruction has been provided may be set.

In a case where the batch analysis has ended, the power controller 405 powers off the first subject element in accordance with the shut-down setting performed in the step S8 (step S15). Next, the power controller 405 determines whether a period of time that is set in the shut-down setting has elapsed (step S16). In a case where the set period of time has not elapsed, the power controller 405 determines whether the analysis system 500 is scheduled to be used next (step S17). In a case where the next use of the analysis system 500 is not scheduled, the power controller 405 returns to the step S16.

The steps S16 and S17 are repeated until the set period of time elapses or the next use of the analysis system 500 is scheduled. In a case where the set period of time has elapsed in the step S16, the power controller 405 powers off the second subject element in accordance with the shut-down setting (step S18) and ends an analysis process.

On the other hand, in a case where the next use of the analysis system 500 is scheduled in the step S17, the power controller 405 ends the analysis process without powering off the second subject element. In this case, the next analysis with use of the analysis system 500 can start in a relatively short period of time. In a case where detecting whether an abnormality has occurred in the analysis system 500 and an abnormality is detected during execution of a batch analysis, the power controller 405 may execute the step S18 as an interruption process.

(6) Effects

In the analysis system 500 according to the present embodiment, a sample is measured efficiently by the plurality of channels 10. Further, even in a case where the plurality of channels 10 are provided, the control screen in regard to control of the plurality of channels 10 is displayed in the display 360. Therefore, running of the analysis system 500 can be identified easily. This improves usability.

For example, it is possible to easily identify which sample is being measured in which channel 10 by viewing the seventh control screen 470. Further, in a case where an abnormality occurs in the analysis system 500, it is possible to easily confirm in which channel an abnormality has occurred. Further, because the user can confirm a batch file at the same time, in a case where an abnormality occurs in the analysis system 500, its cause can be specified and a series of samples the measurement results of which may have been affected can be easily specified.

The user can easily identify a channel in a usable state by viewing the first control screen 410 without actually checking the actual state of the channel 10. Thus, the user can easily select a channel 10 to be used for measurement.

The user can easily identify the running periods of the sample supplier 170, the channel 10, the mass spectrometer 200 and the data processor 408 by viewing the fourth control screen 440. Thus, the user can intuitively set the appropriate running points in time of the sample supplier 170, the channel 10, the mass spectrometer 200 and the data processor 408.

Further, the user can easily perform a setting while confirming an element to be powered off when execution of a batch file ends or the processing device 300 is shut down in the fifth control screen 450. Further, even in a case where the plurality of channels 10 are provided, the user can easily create an appropriate calibration curve and easily identify a calibration curve setting by viewing the sixth control screen 460.

Further, in the present embodiment, even in a case where the plurality of channels 10 are provided, the sample supplier 170, the channel 10, the mass spectrometer and the data processor 408 can run in parallel without interference with an analysis by the first controller 1, the second controller 2, the third controller 3, the fourth controller 4 and the main controller 5. This can improve a throughput and usability.

(7) Other Embodiments

While the analysis system 500 includes the cleaning liquid supplier 130, the sample supplier 170, the mass spectrometer 200 and the display 360 in the above-mentioned embodiment, the embodiment is not limited to this. The analysis system 500 does not have to include part or all of the cleaning liquid supplier 130, the sample supplier 170, the mass spectrometer 200 and the display 360 as long as being connectable to a cleaning liquid supplier, a sample supplier, a detector and a display.

Further, the cleaning liquid supplier 130 does not have to be connected to the analysis system 500. Even in this case, when the high-pressure valve 20 is in the first connection state, a sample supplied by the sample supplier 170 is guided to the analysis column 40 together with a mobile phase that has been supplied by the mobile phase supplier 50. Further, when the high-pressure valve 20 is in the second connection state, a sample that is trapped in the analysis column 40 is separated into components and guided to the mass spectrometer 200 by a mobile phase that has been supplied by the mobile phase supplier 50.

Therefore, in each channel 10, the high-pressure valve 20 is switched between the first connection state and the second connection state. Thus, the sample supplier 170 is disconnected from the measurement flow path 102 while measurement of a sample continues. Therefore, measurement of a sample in any channel 10 and supply of a sample in another channel 10 can be performed in parallel. This improves efficiency of measurement more sufficiently.

(8) Aspects

It is understood by those skilled in the art that the plurality of above-mentioned illustrative embodiments are specific examples of the below-mentioned aspects.

(Item 1) An analysis system according to one aspect may be used together with a sample supplier that supplies a sample, a detector that detects a sample and a display, a plurality of channels arranged in parallel with one another, and a flow-path switcher that selectively guides a sample supplied by the sample supplier to the plurality of channels, a display controller that causes the display to display a control screen in regard to control of the plurality of channels, wherein each of the plurality of channels may include a mobile phase supplier that supplies a mobile phase, and an analysis column that separates a sample that has been supplied by the sample supplier into components and guides the components to the detector.

In this analysis system, a sample is efficiently measured by the plurality of channels. Further, even in a case where the plurality of channels are provided, the control screen in regard to control of the plurality of channels is displayed in the display. Thus, running of the analysis system can be easily identified. This improves usability.

(Item 2p) The analysis system according to item 1, wherein each of the plurality of channels may further include a high-pressure valve that is switchable between a first connection state in which a sample that has been supplied by the sample supplier is guided to the analysis column together with a mobile phase that has been supplied by the mobile phase supplier and a second connection state in which a sample that has been trapped in the analysis column is separated into components and guided to the detector by a mobile phase that has been supplied by the mobile phase supplier.

In this case, in each channel, the high-pressure valve is switched between the first connection state and the second connection state, whereby the sample supplier is disconnected from the flow path for measurement while measurement of a sample continues. Therefore, measurement of a sample in any channel and supply of a sample in another channel can be performed in parallel. This improves efficiency of measurement more sufficiently.

(Item 3) The analysis system according to item 1, wherein the analysis system may further be used together with a cleaning liquid supplier that supplies a cleaning liquid, the flow-path switcher may selectively guide a sample supplied by the sample supplier or a cleaning liquid supplied by the cleaning liquid supplier to the plurality of channels, and each of the plurality of channels may further include a high-pressure valve that is switchable between a first a first connection state in which a mobile phase that has been supplied by the mobile phase supplier is guided to the analysis column through the sample supplier and a second connection state in which a cleaning liquid that has been supplied by the cleaning liquid supplier is guided to the sample supplier while a mobile phase that has been supplied by the mobile phase supplier is guided to the analysis column without going through the sample supplier.

In this case, in each channel, the high-pressure valve is switched between the first connection state and the second connection state. Thus, the sample supplier is cleaned while measurement of a sample continues. This improves efficiency of measurement more sufficiently.

(Item 4) The analysis system according to items 1 to 3, may further include a batch generator that generates a batch file for controlling an analysis sequence based on information in regard to a sample to be used in any channel and an analysis condition, and an analysis executer that controls running of the flow-path switcher and the sample supplier based on a batch file generated by the batch generator.

With this configuration, even in a case where the plurality of channels are provided, a sample analysis is efficiently performed with use of any channel in accordance with a batch file. This improves usability more sufficiently.

(Item 5) The analysis system according to item 4, wherein the display controller may cause the display to display a screen showing a table of a batch file generated by the batch generator and a flow-path diagram showing a current connection state of a channel as the control screen.

In this case, the user can easily identify which sample is being measured in which channel by viewing the control screen. Further, even in a case where an abnormality occurs in the analysis system, it is possible to easily confirm in which channel an abnormality has occurred. Further, since the user can confirm a batch file at the same time, in a case where an abnormality occurs in the analysis system, its cause can be specified, and a series of samples the measurement results of which may have been affected can be easily specified.

(Item 6) The analysis system according to item 4 or 5, may further include a power controller, wherein the display controller may cause the display to display a screen for receiving a setting of a subject element, out of the sample supplier, the detector and the mobile phase supplier, to be powered off when execution of a batch file generated by the batch generator ends, and a setting of a subject element, out of the sample supplier, the detector and the mobile phase supplier, to be powered off when the analysis executer is shut down, as the control screen, the power controller may power off the sample supplier, the detector or the mobile phase supplier in accordance with a setting received in the control screen.

In this case, the user can easily perform a setting while confirming an element to be powered off when execution of a batch file ends or the analysis executer shuts down in the control screen.

(Item 7) The analysis system according to any one of items 1 to 6, wherein the display controller may cause the display to display a screen distinguishably showing a channel in a usable state and a channel in an unusable state as the control screen.

In this case, the user can easily identify a channel being in a usable state by viewing the control screen without actually checking the actual state of the channel. Thus, the user can easily select a channel to be used for measurement.

(Item 8) The analysis system according to any one of items 1 to 7, may further include a data processor that processes detection data of a sample provided by the detector, and a timing setter, wherein the display controller may cause the display to display a screen showing graphs of running periods of the sample supplier, any channel, the detector and the data processor as the control screen, and the timing setter may set a point in time at which a sample is to be injected by the sample supplier and a point in time at which a sample derived from the any channel is to be detected by the detector, and a period in which a signal output from the detector due to detection of a sample is to be processed in the data processor.

In this case, the user can easily identify the running periods of the sample supplier, the channel, the detector and the data processor by viewing the control screen. Thus, the user can intuitively set appropriate running points in time of the sample supplier, the channel, the detector and the data processor.

(Item 9) The analysis system according to any one of items 1 to 8 may further include a calibration curve setter that receives selection between a setting for creation of a calibration curve individually corresponding to one or more channels out of the plurality of channels and a setting for creation of a calibration curve commonly corresponding to two or more channels out of the plurality of channels, and a calibration curve creator that creates a calibration curve to be used by a channel based on a setting selected by the calibration curve setter and a sample guided to the channel in regard to the setting, wherein the display controller may cause the display to display a screen showing a setting selected in the calibration curve setter as the control screen.

With this configuration, even in a case where the plurality of channels are provided, an appropriate calibration curve can be easily created. Further, the user can easily identify a selected setting for creating a calibration curve by viewing the control screen.

(Item 10) An analysis system according to another aspect may be used together with a sample supplier that supplies a sample, a detector that detects a sample and a display, and may include a plurality of channels arranged in parallel with one another, a flow-path switcher that selectively guides a sample supplied by the sample supplier to the plurality of channels, and an analysis control device, wherein each of the plurality of channels may include a mobile phase supplier that supplies a mobile phase, and an analysis column that separates a sample that has been supplied by the sample supplier into components and guides the components to the detector, and the data control device may include a data processor, an inputter that inputs running points in time of the sample supplier, any channel out of the plurality of channels, the detector and the data processor, a first controller that controls the sample supplier such that the sample supplier supplies a sample, a second controller that controls the flow-path switcher such that a sample supplied by the sample supplier is guided to the any channel, a third controller that controls the detector such that the detector detects a sample guided from the any channel, a fourth controller that controls the data processor such that the data processor processes detection data of a sample detected by the detector, and a main controller that controls the first controller, the second controller, the third controller and the fourth controller in accordance with running points in time that have been input to the inputter.

In this analysis system, a sample is efficiently measured by the plurality of channels. Further, even in a case where the plurality of channels are provided, the sample supplier, the channels, the mass spectrometer and the data processor can run in parallel without interference with an analysis by the first controller, the second controller, the third controller, the fourth controller and the main controller. This can improve a throughput and usability.

(Item 11) An analysis execution method according to yet another aspect may be used together with a sample supplier that supplies a sample, a detector that detects a sample and a display, and may include selectively guiding a sample supplied by the sample supplier to a plurality of channels arranged in parallel with one another by a flow-path switcher, and causing the display to display a control screen in regard to control of the plurality of channels, wherein each of the plurality of channels may include a mobile phase supplier that supplies a mobile phase, and an analysis column that separates a sample that has been supplied by the sample supplier into components and guides the components to the detector.

With the analysis execution method, even in a case where the plurality of channels are provided, because the control screen in regard to the control of the plurality of channels is displayed in the display, the user can easily identify running of the analysis system. This improves usability.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. An analysis system that is used together with a sample supplier that supplies a sample, a detector that detects a sample, and a display, the analysis system comprising:
   a plurality of channels arranged in parallel with one another;
   a flow-path switcher that selectively guides a sample supplied by the sample supplier to the plurality of channels;
   a display controller that causes the display to display a control screen in regard to control of the plurality of channels;

a calibration curve setter that receives a selection between a first setting for creation of a calibration curve individually corresponding to one or more channels out of the plurality of channels and a second setting for creation of a calibration curve commonly corresponding to two or more channels out of the plurality of channels; and a calibration curve creator that creates a calibration curve to be used by a channel of the plurality of channels in regard to the first setting or the second setting based on the first setting or the second setting selected in the calibration curve setter and a sample guided to the channel, wherein each of the plurality of channels comprises:
a mobile phase supplier that supplies a mobile phase; and
an analysis column that separates the sample that has been supplied by the sample supplier into components and guides the components to the detector, and wherein display controller causes the display to display a screen showing the first setting or the second setting selected in the calibration curve setter as the control screen.

2. The analysis system according to claim 1, wherein each of the plurality of channels further includes a high-pressure valve that is switchable between a first connection state in which a sample that has been supplied by the sample supplier is guided to the analysis column together with a mobile phase that has been supplied by the mobile phase supplier and a second connection state in which a sample that has been trapped in the analysis column is separated into components and guided to the detector by a mobile phase that has been supplied by the mobile phase supplier.

3. The analysis system according to claim 1, wherein the analysis system is further used together with a cleaning liquid supplier that supplies a cleaning liquid, the flow-path switcher selectively guides the sample supplied by the sample supplier to the plurality of channels during the supply of the sample, and selectively guides a cleaning liquid supplied by the cleaning liquid supplier to the plurality of channels during cleaning of a flow path before or after the supply of the sample, and each of the plurality of channels further includes a high-pressure valve that is switchable between a first connection state in which a mobile phase that has been supplied by the mobile phase supplier is guided to the analysis column through the sample supplier and a second connection state in which a cleaning liquid that has been supplied by the cleaning liquid supplier is guided to the sample supplier while a mobile phase that has been supplied by the mobile phase supplier is guided to the analysis column without going through the sample supplier.

4. The analysis system according to claim 1, further comprising:
a determiner that determines whether each channel of the plurality of channels is in an unusable state due to an occurrence of error,
wherein the display controller causes the display to display a screen distinguishably showing a channel of the plurality of channels in a usable state and a channel of the plurality of channels in an unusable state due to the occurrence of error as the control screen.

5. An analysis system that is used together with a sample supplier that supplies a sample, a detector that detects a sample and a display, the analysis system comprising:

a plurality of channels arranged in parallel with one another;
a flow-path switcher that selectively guides the sample supplied by the sample supplier to the plurality of channels;
a display controller that causes the display to display a control screen in regard to control of the plurality of channels;
a batch generator that generates a batch file for controlling an analysis sequence based on information in regard to a sample to be used in any of the plurality of channels and an analysis condition;
an analysis executer that controls running of the flow-path switcher and the sample supplier based on the batch file generated by the batch generator; and
a power controller,
wherein each of the plurality of channels comprises:
a mobile phase supplier that supplies a mobile phase, and
an analysis column that separates the sample that has been supplied by the sample supplier into components and guides the components to the detector,
wherein the display controller causes the display to display a screen for receiving a first setting of a subject element, out of the sample supplier, the detector and the mobile phase supplier, to be individually powered off when execution of the batch file generated by the batch generator ends, and a second setting of a subject element, out of the sample supplier, the detector and the mobile phase supplier, to be individually powered off when the analysis executer is shut down, as the control screen, and
wherein the power controller individually powers off the sample supplier, the detector, or the mobile phase supplier in accordance with the first setting or the second setting received in the control screen.

6. The analysis system according to claim 5,
wherein the display controller causes the display to display a screen showing a table of the batch file generated by the batch generator and a flow-path diagram showing a current connection state of a channel of the plurality of channels, and also showing a portion of the batch file corresponding to a current stage of progress in the analysis sequence such that the portion is distinguishable from another portion of the batch file as the control screen.

7. An analysis system that is used together with a sample supplier that supplies a sample, a detector that detects a sample and a display, the analysis system comprising:
a plurality of channels arranged in parallel with one another;
a flow-path switcher that selectively guides the sample supplied by the sample supplier to the plurality of channels;
a display controller that causes the display to display a control screen in regard to control of the plurality of channels;
a data processor that processes detection data of a sample provided by the detector; and
a timing setter,
wherein each of the plurality of channels comprises:
a mobile phase supplier that supplies a mobile phase, and
an analysis column that separates the sample that has been supplied by the sample supplier into components and guides the components to the detector, wherein the display controller causes the display to display a screen showing graphs of running periods of the sample supplier, any of the plurality of channels, the detector and the data processor as the control screen, and wherein the timing setter sets a point in time at which a sample is to be injected by the sample supplier and a point in time at which a sample derived from the any of the plurality of channels is to be detected by the detector, and a period in which a signal output from the detector due to detection of a sample is to be processed in the data processor.

\* \* \* \* \*